(12) United States Patent
Kiyota et al.

(10) Patent No.: US 10,323,386 B2
(45) Date of Patent: Jun. 18, 2019

(54) SURROUNDINGS MONITORING SYSTEM FOR WORK MACHINE

(71) Applicant: SUMITOMO HEAVY INDUSTRIES, LTD., Tokyo (JP)

(72) Inventors: Yoshihisa Kiyota, Kanagawa (JP); Shunsuke Otsuki, Kanagawa (JP); Susumu Aizawa, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 15/924,778

(22) Filed: Mar. 19, 2018

(65) Prior Publication Data

US 2018/0209122 A1    Jul. 26, 2018

Related U.S. Application Data

(63) Continuation of application No. PCT/JP2016/085045, filed on Nov. 25, 2016.

(30) Foreign Application Priority Data

Nov. 30, 2015    (JP) .................. 2015-233975

(51) Int. Cl.
| | |
|---|---|
| *B60Q 1/00* | (2006.01) |
| *E02F 9/24* | (2006.01) |
| *E02F 9/26* | (2006.01) |
| *H04N 7/18* | (2006.01) |
| *G08B 13/196* | (2006.01) |
| *B60R 1/00* | (2006.01) |

(52) U.S. Cl.
CPC ............. *E02F 9/24* (2013.01); *E02F 9/26* (2013.01); *E02F 9/262* (2013.01);
(Continued)

(58) Field of Classification Search
CPC ........ E02F 9/24; B66C 15/00; Y01S 367/909; B60Q 9/008
(Continued)

(56) References Cited

U.S. PATENT DOCUMENTS

| | | | | |
|---|---|---|---|---|
| 5,198,800 | A * | 3/1993 | Tozawa | ................. E02F 9/2033 |
| | | | | 212/276 |
| 7,865,285 | B2 * | 1/2011 | Price | ...................... E02F 3/434 |
| | | | | 172/4.5 |

(Continued)

FOREIGN PATENT DOCUMENTS

| | | |
|---|---|---|
| JP | H03-187423 | 8/1991 |
| JP | H04-371616 | 12/1992 |

(Continued)

OTHER PUBLICATIONS

International Search Report for PCT/JP2016/085045 dated Feb. 21, 2017.

*Primary Examiner* — Toan N Pham
(74) *Attorney, Agent, or Firm* — IPUSA, PLLC

(57) ABSTRACT

A surroundings monitoring system for a work machine includes a detecting part to detect a monitoring target around the work machine and a control part to switch the state of the work machine between first and second states based on the detection result. The first state includes a state where a restriction on the operation of the work machine is canceled or a state where an alarm is stopped. The second state includes a state where the operation is restricted or stopped or a state where the alarm is output. The control part returns the state of the work machine to the first state when a predetermined condition is satisfied after switching the state to the second state. The predetermined condition includes that no monitoring target is detected around the work machine and that it is ensured that the work machine is prevented from starting to operate.

20 Claims, 21 Drawing Sheets

(52) U.S. Cl.
CPC . *G08B 13/19602* (2013.01); *G08B 13/19641* (2013.01); *H04N 7/18* (2013.01); *H04N 7/181* (2013.01); *B60R 1/00* (2013.01); *B60R 2300/105* (2013.01)

(58) Field of Classification Search
USPC .................................................. 340/435, 436
See application file for complete search history.

(56) References Cited

U.S. PATENT DOCUMENTS

| | | | | |
|---|---|---|---|---|
| 8,248,263 | B2* | 8/2012 | Shervey | F16P 3/147 |
| | | | | 340/539.1 |
| 9,014,939 | B1 | 4/2015 | Mendenhall et al. | |
| 9,030,332 | B2* | 5/2015 | Tafazoli Bilandi | E02F 9/24 |
| | | | | 340/686.1 |
| 9,457,718 | B2* | 10/2016 | Husted | E02F 9/261 |
| 9,990,543 | B2* | 6/2018 | Fukuda | G08G 1/166 |
| 2012/0037585 | A1* | 2/2012 | Jene | B66C 23/905 |
| | | | | 212/276 |
| 2012/0287277 | A1 | 11/2012 | Koehrsen et al. | |
| 2013/0088593 | A1* | 4/2013 | Ishimoto | E02F 9/226 |
| | | | | 348/143 |

FOREIGN PATENT DOCUMENTS

| | | |
|---|---|---|
| JP | H05-028382 | 2/1993 |
| JP | H05-064254 U | 8/1993 |
| JP | 2014-181508 | 9/2014 |
| JP | 2014-181509 | 9/2014 |
| JP | 2015-063864 | 4/2015 |

* cited by examiner

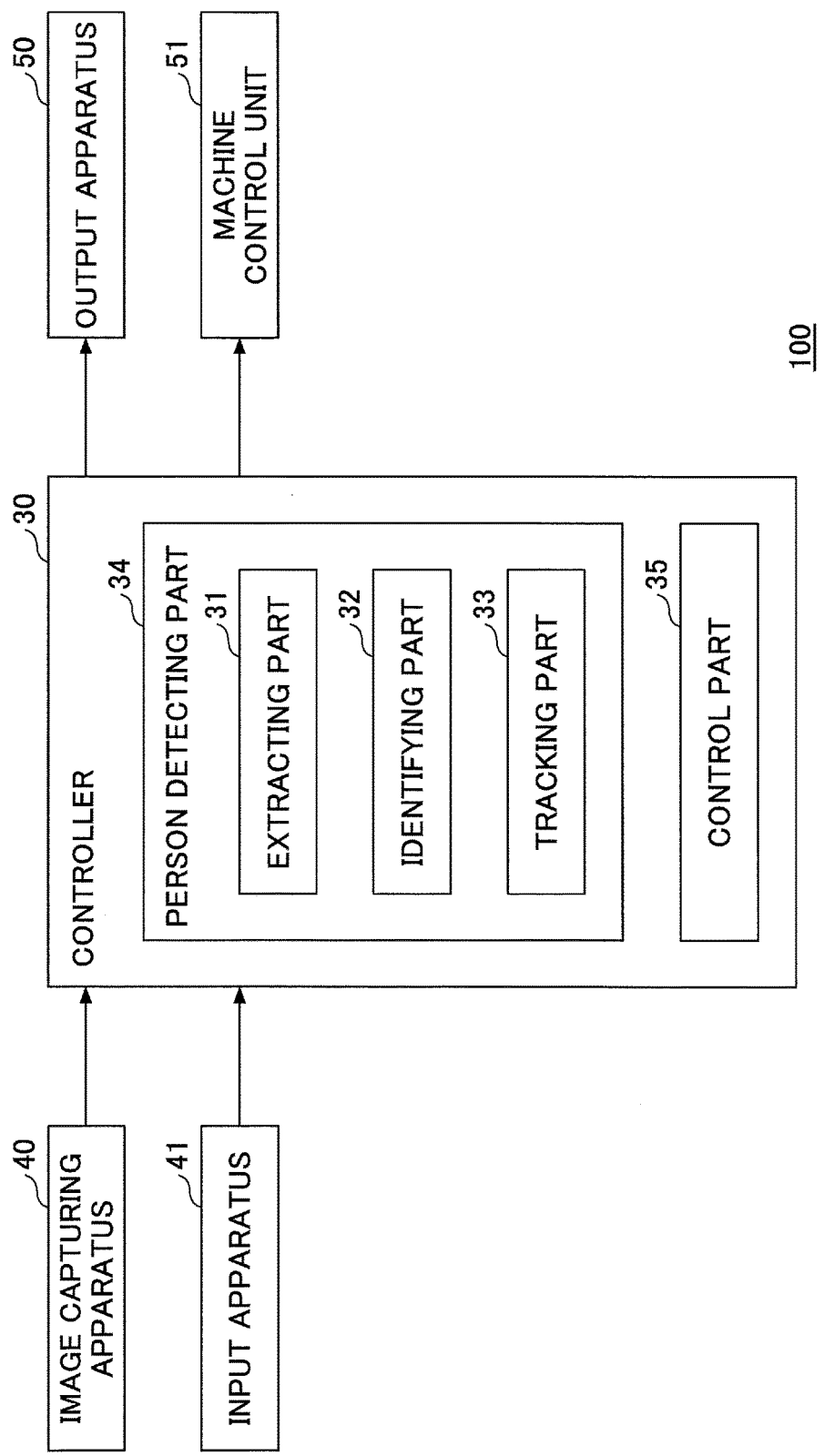

TRgt4

FIG.8A
FIG.8B
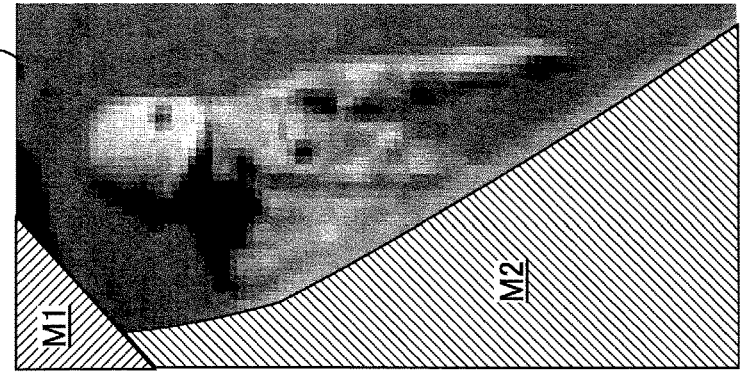
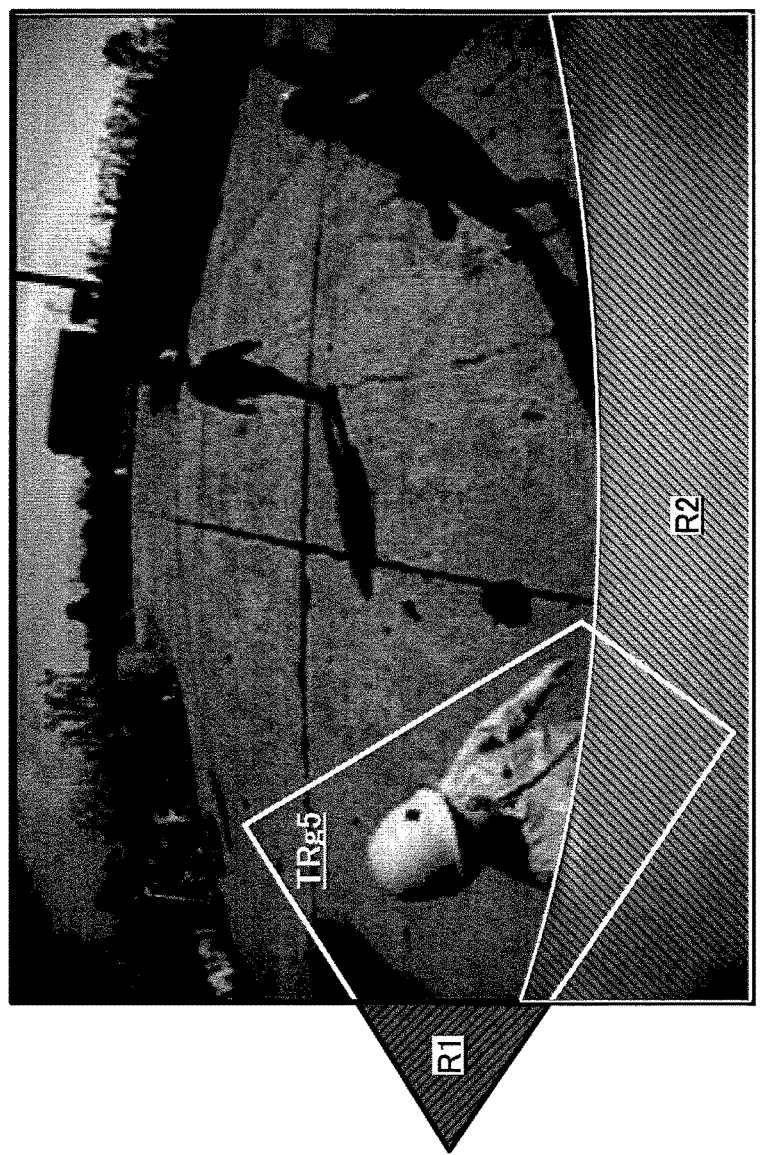

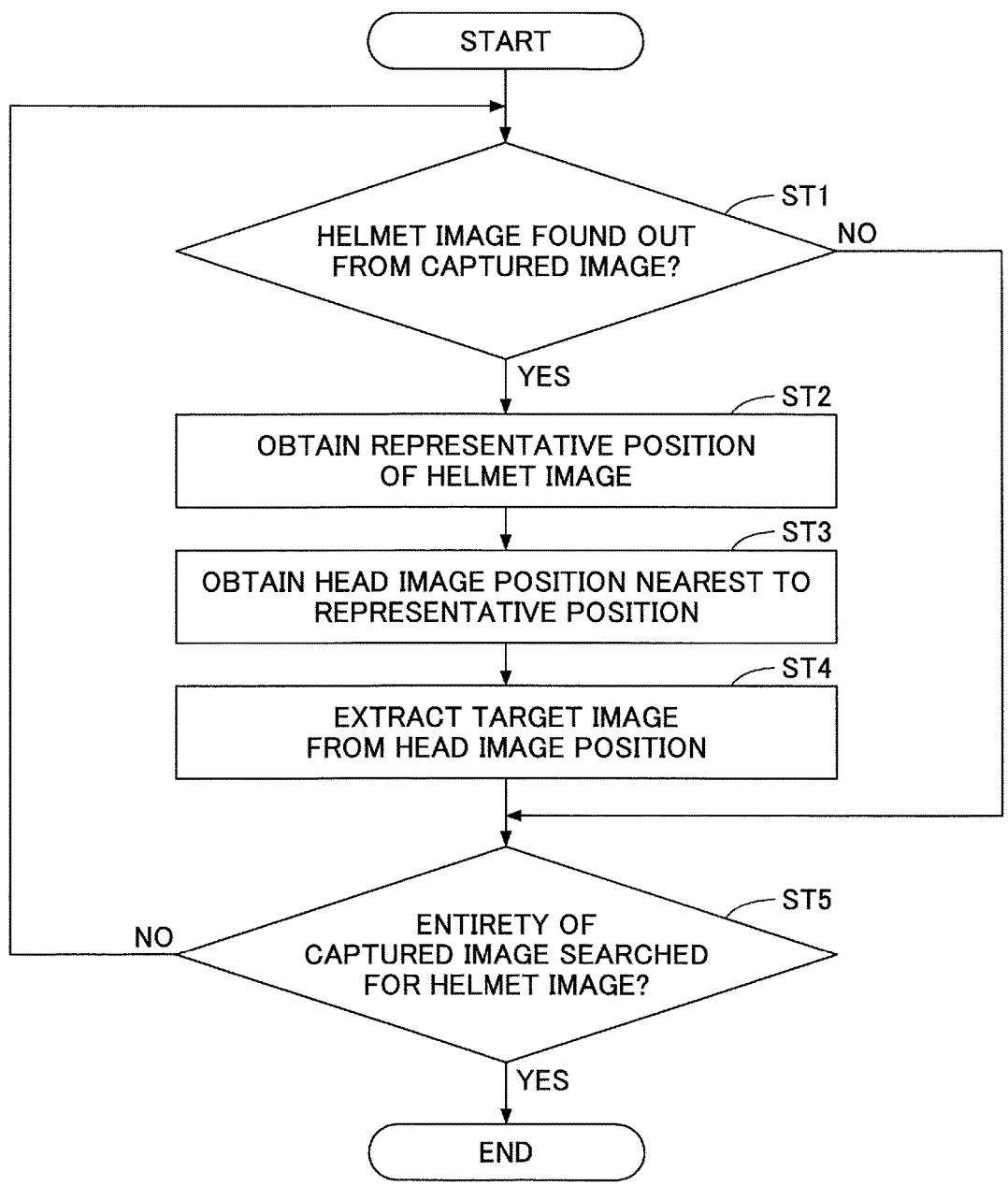

FIG.15B

| FIRST CANCELLATION CONDITION |
|---|
| · ABSENCE OF PERSON WITHIN PREDETERMINED AREA AROUND SHOVEL |
| · · CURRENT PERSON DETECTED STATE IS NO LONGER SECOND PERSON DETECTED STATE (ALARMING STATE) |
| · · CURRENT PERSON DETECTED STATE IS NO LONGER EITHER OF FIRST PERSON DETECTED STATE (ON-ALERT STATE) AND SECOND PERSON DETECTED STATE (ALARMING STATE) |
| · · PERSON PRESENCE/ABSENCE DETERMINING PART 350 DETERMINES ABSENCE OF PERSON WITHIN PREDETERMINED AREA AROUND SHOVEL BASED ON FINAL PERSON DETECTION RESULT OF TRACKING PART 33 CONSTITUTING PERSON DETECTING PART 34 |

| SECOND CANCELLATION CONDITION |
|---|
| ·· IT IS ENSURED THAT SHOVEL IS PREVENTED FROM STARTING TO OPERATE |
| ·· GATE LOCK LEVER IS LOWERED (OPERATION APPARATUS IS DISABLED) |
| ·· ENGINE IS STOPPED |
| ·· OPERATION OF HYDRAULIC ACTUATOR IS RESTRICTED OR STOPPED |
| ·· MAXIMUM SWING SPEED AND/OR MAXIMUM TRAVEL SPEED IS RESTRICTED |
| ·· ALL OPERATION APPARATUSES ARE IN NEUTRAL POSITION FOR PREDETERMINED TIME OR MORE |
| ·· OPERATOR'S HANDS AND FEET ARE OFF ALL OPERATION APPARATUSES |
| ··· IT IS DETECTED THAT OPERATOR'S HANDS AND FEET ARE OFF ALL OPERATION APPARATUSES BASED ON CAPTURED IMAGE OF CAMERA TO CAPTURE IMAGE INSIDE CAB |
| ··· IT IS DETECTED THAT OPERATOR'S HANDS AND FEET ARE OFF ALL OPERATION APPARATUSES BASED ON OUTPUT OF CAPACITIVE SENSOR ATTACHED TO OPERATION APPARATUS (FOR EXAMPLE, GRIP OF OPERATION LEVER) |
| ··· PREDETERMINED CANCELLATION OPERATION HAS BEEN PERFORMED |
| ··· WITH MESSAGE SUCH AS "IS IT ENSURED THAT SHOVEL IS PREVENTED FROM STARTING TO OPERATE?" BEING DISPLAYED ON SCREEN OF IN-VEHICLE DISPLAY, CONFIRMATION BUTTON (FOR EXAMPLE, HORN BUTTON OR SOFTWARE BUTTON DISPLAYED ON SAME SCREEN) IS DEPRESSED |
| ··· OPERATOR HAS PERFORMED CANCELLATION OPERATION SUCH AS INPUTTING OPERATION TO LEVER, BUTTON, PANEL OR THE LIKE AT DRIVER'S SEAT |

| THIRD CANCELLATION CONDITION | |
|---|---|
| · IT IS CONFIRMED BY OPERATOR THAT PERSON IS ABSENT AROUND SHOVEL | |
| ·· CONFIRMATION BUTTON IS DEPRESSED WITH MESSAGE SUCH AS "IS IT CONFIRMED THAT THERE IS NO PERSON AROUND SHOVEL?" BEING DISPLAYED ON SCREEN OF IN-VEHICLE DISPLAY | |

SURROUNDINGS MONITORING SYSTEM FOR WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2016/085045, filed on Nov. 25, 2016 and designating the U.S., which claims priority to Japanese Patent Application No. 2015-233975, filed on Nov. 30, 2015. The entire contents of the foregoing applications are incorporated herein by reference.

BACKGROUND

Technical Field

The present invention relates to surroundings monitoring systems for a work machine to monitor the surroundings of a work machine.

Description of Related Art

A system that sets multiple virtual risk potential zones around a work machine and stops the operation of the work machine when a monitoring target moves from a low-risk zone into a high-risk zone is known.

SUMMARY

According to an aspect of the present invention, a surroundings monitoring system for a work machine includes a detecting part to detect a monitoring target around the work machine and a control part to switch the state of the work machine between first and second states based on the detection result of the detecting part. The first state includes a state where a restriction on the operation of the work machine is canceled or a state where an alarm is stopped. The second state includes a state where the operation is restricted or stopped or a state where the alarm is output. The control part returns the state of the work machine to the first state when a predetermined condition is satisfied after switching the state to the second state. The predetermined condition includes that no monitoring target is detected around the work machine and that it is ensured that the work machine is prevented from starting to operate.

BRIEF DESCRIPTION OF THE DRAWINGS

FIG. 2 is a functional block diagram illustrating a configuration of the surroundings monitoring system;

FIGS. 8A and 8B are diagrams illustrating the relationship between a target image region and an identification process unsuitable region;

FIG. 12 is a flowchart illustrating the flow of an image extracting process;

FIG. 15B is a table illustrating examples of a first cancellation condition;

FIG. 15C is a table illustrating examples of a second cancellation condition; and FIG. 15D is a table illustrating examples of a third cancellation condition.

DETAILED DESCRIPTION

According to the above-described system, however, when the monitoring target moves from a high-risk zone into a low-risk zone, the stopping of the operation of the work machine may be canceled to suddenly start the operation of the work machine.

In view of the above, it is desired to provide a surroundings monitoring system for a work machine capable of more properly canceling a restriction on the operation of a work machine applied in response to the detection of a monitoring target.

According to an aspect of the present invention, a surroundings monitoring system for a work machine capable of more properly canceling a restriction on the operation of a work machine applied in response to the detection of a monitoring target is provided.

One or more embodiments are described below with reference to the accompanying drawings.

Figure 1:
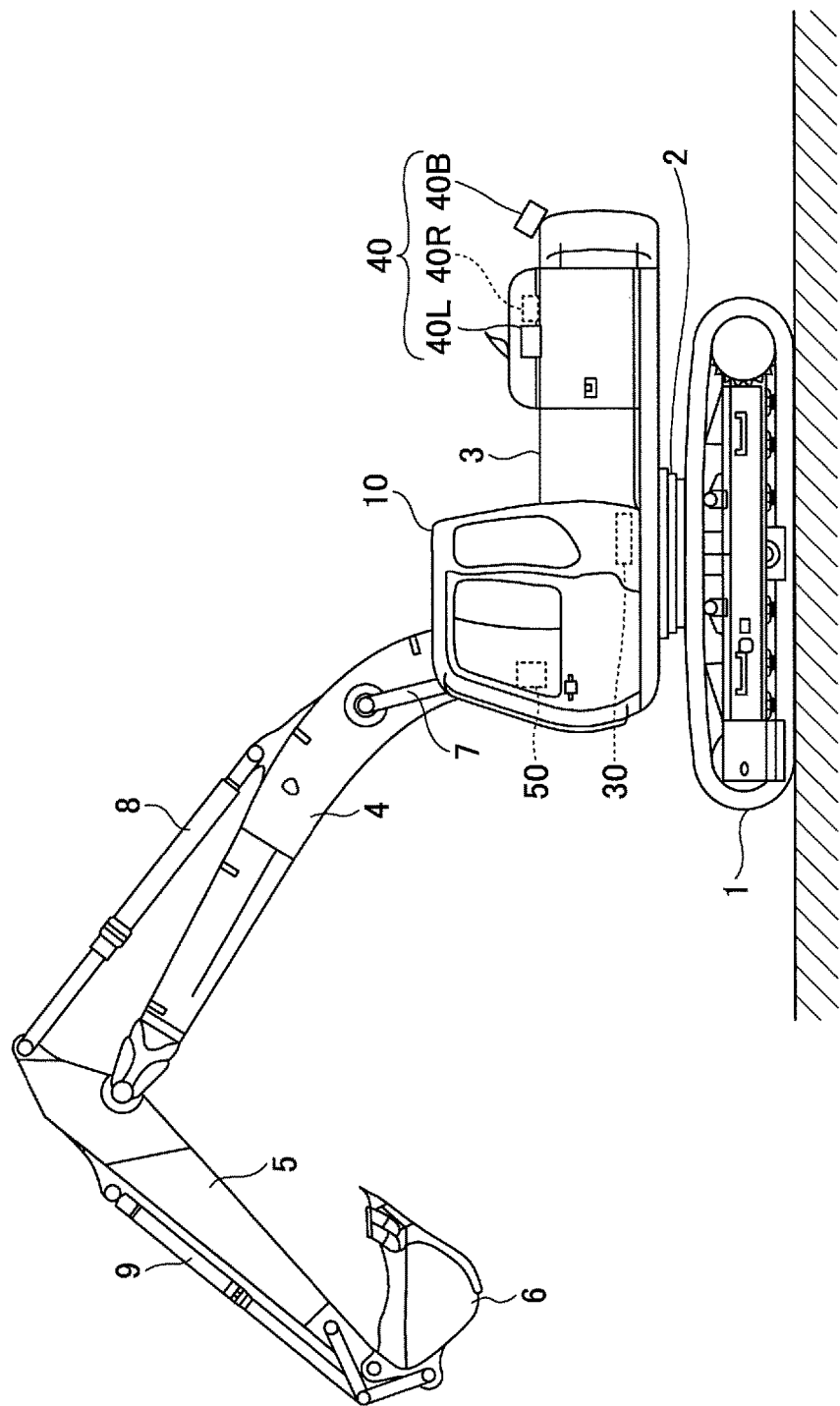
FIG. 1 is a side view of a shovel in which a surroundings monitoring system according to an embodiment of the present invention is mounted.

FIG. 1 is a side view of a shovel as a construction machine on which a surroundings monitoring system 100 according to an embodiment of the present invention is mounted. An upper rotating structure 3 is mounted on a traveling undercarriage 1 of the shovel through a swing mechanism 2. A boom 4 is attached to the upper rotating structure 3. An arm 5 is attached to an end of the boom 4. A bucket 6 is attached to an end of the arm 5. The boom 4, the arm 5, and the bucket 6 form an excavation attachment, and are hydraulically driven by a boom cylinder 7, an arm cylinder 8, and a bucket cylinder 9, respectively. A cabin 10 is provided and power sources such as an engine are mounted on the upper rotating structure 3. An image capturing apparatus 40 is attached to the top of the upper rotating structure 3. Specifically, a back-side camera 40B, a left-side camera 40L, and a right-side camera 40R are attached to the upper back end, the upper left end, and the upper right end, respectively, of the upper rotating structure 3. Furthermore, a controller 30 and an output apparatus 50 are installed in the cabin 10.

FIG. 2 is a functional block diagram illustrating a configuration of the surroundings monitoring system 100. The surroundings monitoring system 100 mainly includes the controller 30, the image capturing apparatus 40, and the output apparatus 50.

The controller 30 is a control unit to control the driving of the shovel. According to this embodiment, the controller 30 is composed of a processing unit including a CPU and an internal memory, and causes the CPU to execute a drive control program stored in the internal memory to implement various functions.

Furthermore, the controller 30 determines whether a person is present around the shovel based on the outputs of various devices, and controls various devices based on the result of the determination. Specifically, the controller 30 receives the outputs of the image capturing apparatus 40 and an input apparatus 41, and executes software programs corresponding to an extracting part 31, an identifying part 32, a tracking part 33, and a control part 35. Then, based on the results of the execution, the controller 30 outputs a control command to a machine control unit 51 to control the driving of the shovel, or causes the output apparatus 50 to output various kinds of information. The controller 30 may be a control unit dedicated for image processing.

For example, the controller 30 controls various devices through the control part 35. The control part 35 is a functional element to control various devices. For example, the control part 35 controls various devices in response to an operator's inputs through the input apparatus 41. Specifically, the control part 35 switches a display image displayed on the screen of an in-vehicle display in response to an image switch command input through a touchscreen. The display image includes a through image of the back-side camera 40B, a through image of the right-side camera 40R, a through image of the left-side camera 40L, a view transformed image, etc. A view transformed image is, for example, a bird's-eye image (an image viewed from a virtual viewpoint immediately above the shovel) into which the captured images of multiple cameras are synthesized. A through image is an image capturing a scene that is seen when looking in a direction that a camera faces from the position of the camera, and includes, for example, an image not subjected to view transformation.

The image capturing apparatus 40 is an apparatus to capture an image of the surroundings of the shovel, and outputs a captured image to the controller 30. According to this embodiment, the image capturing apparatus 40 is a wide-angle camera adopting an imaging device such as a CCD, and is attached to the top of the upper rotating structure 3 so that the optical axis points obliquely downward.

The input apparatus 41 is an apparatus to receive an operator's inputs. According to this embodiment, the input apparatus 41 includes an operation apparatus (operation levers, operation pedals, etc.), a gate lock lever, a button installed at an end of the operation apparatus, buttons attached to an in-vehicle display, a touchscreen, etc.

The output apparatus 50 is an apparatus to output various kinds of information, and includes, for example, an in-vehicle display to display various kinds of image information, an in-vehicle loudspeaker to audibly output various kinds of audio information, an alarm buzzer, an alarm lamp, etc. According to this embodiment, the output apparatus 50 outputs various kinds of information in response to control commands from the controller 30.

The machine control unit 51 is an apparatus to control the operation of the shovel, and includes, for example, a control valve to control a flow of hydraulic oil in a hydraulic system, a gate lock valve, an engine control unit, etc.

The extracting part 31 is a functional element to extract an identification process target image from a captured image captured by the image capturing apparatus 40. Specifically, the extracting part 31 extracts an identification process target image by image processing of a relatively small amount of computation that extracts a simple feature based on a local luminance gradient or edge, a geometric feature by Hough transform or the like, a feature related to the area or aspect ratio of a region divided based on luminance, and so on (hereinafter, "preceding image recognition process"). An identification process target image (hereinafter, "target image") is a partial image (a part of a captured image) to be subjected to subsequent image processing, and includes a prospective person image. A prospective person image is a partial image (a part of a captured image) that is highly likely to be a person image.

The identifying part 32 is a functional element to identify whether a prospective person image included in a target image extracted by the extracting part 31 is a person image. Specifically, the identifying part 32 identifies whether a prospective person image is a person image by image processing of a relatively large amount of computation such as an image recognition process using image feature description typified by HOG (Histograms of Oriented Gradients) features and a classifier generated by machine learning (hereinafter, "succeeding image recognition process"). The identifying part 32 identifies a prospective person image as a person image at a higher rate as the extracting part 31 extracts a target image with higher accuracy. In such cases where a captured image of desired quality cannot be obtained in circumstances unsuitable for image capturing, such as at night-time or in bad weather, the identifying part 32 may identify every prospective person image as a person image, and identify every prospective person image in a target image extracted by the extracting part 31 as a person, in order to prevent a person from escaping detection.

Figure 3B:
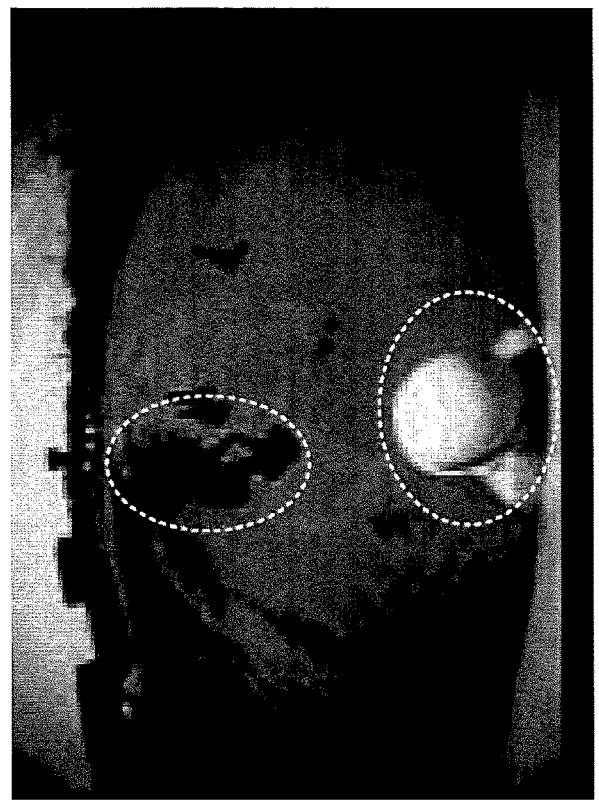
FIGS. 3A and 3B illustrate captured images of a back-side camera.
Figure 3A:
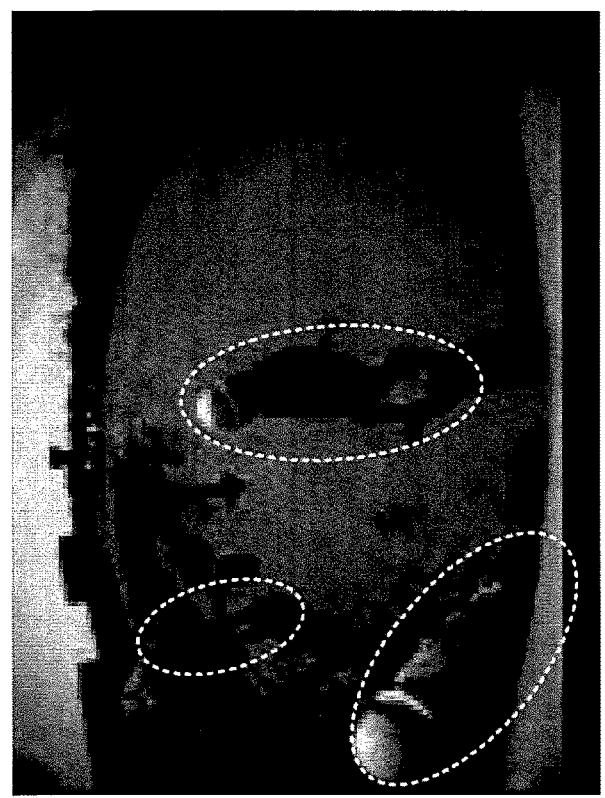

Next, how a person image appears in a captured image of the back side of the shovel captured by the back-side camera 40B is described with reference to FIGS. 3A and 3B. The two captured images of FIGS. 3A and 3B are examples of the captured images of the back-side camera 40B. Furthermore, the dotted circles of FIGS. 3A and 3B represent the presence of a person and are not shown in an actual captured image.

The back-side camera 40B is a wide-angle camera, and is attached at a height to look down at a person obliquely from above. Therefore, how a person image appears in a captured image greatly differs depending on a direction in which a person is present in a view from the back-side camera 40B. For example, in a captured image, a person image closer to the left or right end of the captured image is shown with a greater inclination. This is because of image inclination due to the wide-angle lens of a wide-angle camera. Furthermore, a head closer to the back-side camera 40B is shown larger. Furthermore, a leg is in a blind spot of the body of the shovel and disappears from view. These are because of the installation position of the back-side camera 40B. Therefore, it is difficult to identify a person image included in a captured image by image processing without performing any processing on the captured image.

Therefore, the surroundings monitoring system 100 according to the embodiment of the present invention facilitates identification of a person image included in a captured image by normalizing a target image. Here, "normalization" means conversion of a target image into an image of a predetermined size and a predetermined shape. According to this embodiment, a target image that may take various shapes in a captured image is converted into a rectangular image of a predetermined size by projective transformation. For example, a projective transformation matrix of eight variables is used as projective transformation.

Figure 4:
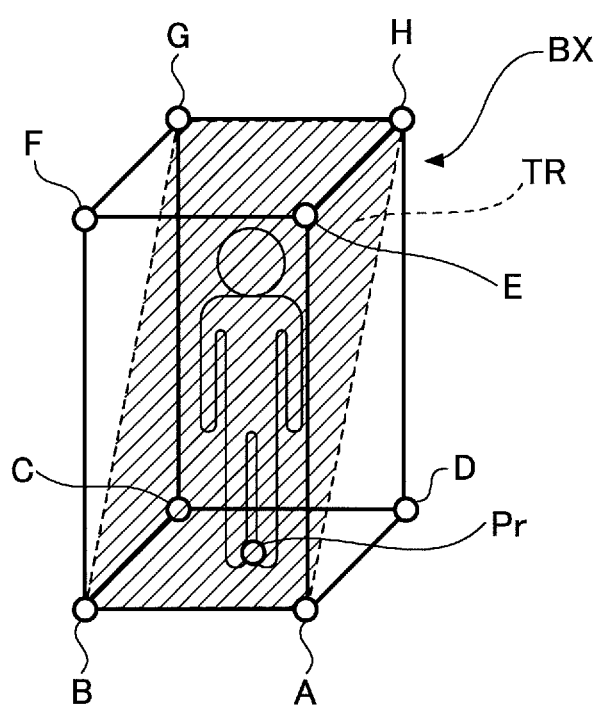
FIG. 4 is a schematic diagram illustrating a geometric relationship used in clipping a target image from a captured image.

Here, a process of normalizing a target image by the surroundings monitoring system 100 (hereinafter, "normalization process") is described with reference to FIGS. 4 through 6C. FIG. 4 is a schematic diagram illustrating a geometric relationship that the extracting part 31 uses to clip a target image from a captured image.

A box BX in FIG. 4 is a virtual solid object in a real space, and is a virtual rectangular parallelepiped defined by eight vertices A through H. Furthermore, a point Pr is a reference point preset to refer to a target image. According to this embodiment, the reference point Pr is a point preset as an assumed standing position of a person, and is located at the center of a quadrangle ABCD defined by four vertices A through D. Furthermore, the size of the box BX is determined based on the orientation, pace, stature, etc., of a person. According to this embodiment, the quadrangle ABCD and a quadrangle EFGH are squares whose side is, for example, 800 mm long. Furthermore, the height of the rectangular parallelepiped is, for example, 1800 mm. That is, the box BX is a rectangular parallelepiped of 800 mm in width, 800 mm in depth, and 1800 mm in height.

A quadrangle ABGH defined by four vertices A, B, G and H forms a virtual plane region TR corresponding to the region of a target image in a captured image. Furthermore, the quadrangle ABGH as the virtual plane region TR is inclined relative to a virtual ground surface that is a horizontal plane.

According to this embodiment, the box BX as a virtual rectangular parallelepiped is adopted to determine the relationship between the reference point Pr and the virtual plane region TR. Other geometric relationships such as relationships using other virtual solid objects, however, may be adopted, and other mathematical relationships such as functions, conversion tables, etc., may be adopted, as long as the virtual plane region TR facing toward the image capturing apparatus 40 and inclined relative to a virtual ground surface can be determined in relation to any reference point Pr.

Figure 5:
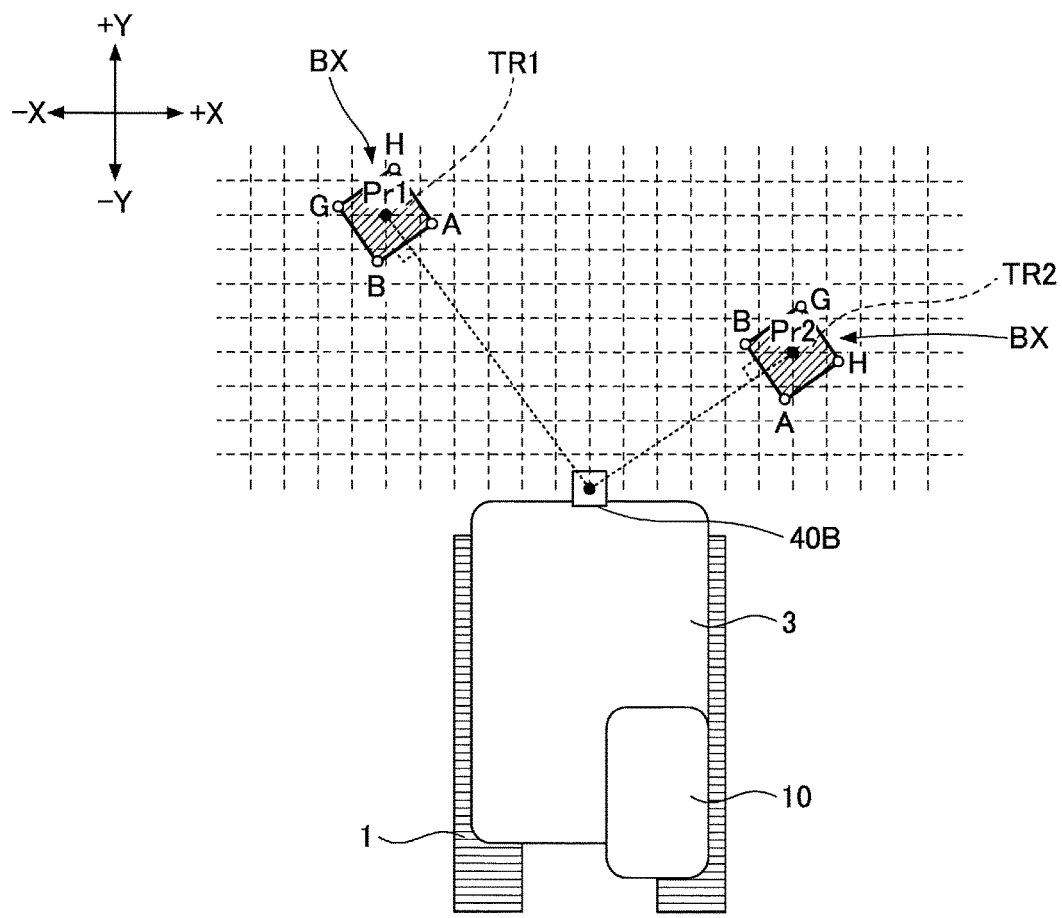
FIG. 5 is a top plan view of a real space on the back side of the shovel.

FIG. 5 is a top plan view of a real space on the back side of the shovel, illustrating the positional relationship between the back-side camera 40B and virtual plane regions TR1 and TR2 in the case where the virtual plane regions TR1 and TR2 are referred to using reference points Pr1 and Pr2. According to this embodiment, the reference point Pr may be placed at each of the grid points of a virtual grid on a virtual ground surface. The reference point Pr, however, may be irregularly placed on a virtual ground surface, or may be placed at regular intervals on line segments radially extending from the projected point of the back-side camera 40B on a virtual ground surface. For example, the line segments radially extend at intervals of one degree, and the reference point Pr is placed on each line segment at intervals of 100 mm.

As illustrated in FIGS. 4 and 5, a first face of the box BX defined by a quadrangle ABFE (see FIG. 4) is placed to directly face the back-side camera 40B when the virtual plane region TR1 is referred to using the reference point Pr1. That is, a line segment connecting the back-side camera 40B and the reference point Pr1 is orthogonal to the first face of the box BX placed in relation to the reference point Pr1 in a top plan view. Likewise, the first face of the box BX is also placed to directly face the back-side camera 40B when the virtual plane region TR2 is referred to using the reference point Pr2. That is, a line segment connecting the back-side camera 40B and the reference point Pr2 is orthogonal to the first face of the box BX placed in relation to the reference point Pr2 in a top plan view. This relationship holds whichever grid point the reference point Pr is placed on. That is, the box BX is placed to have its first face always face the back-side camera 40B directly.

Figure 6A:
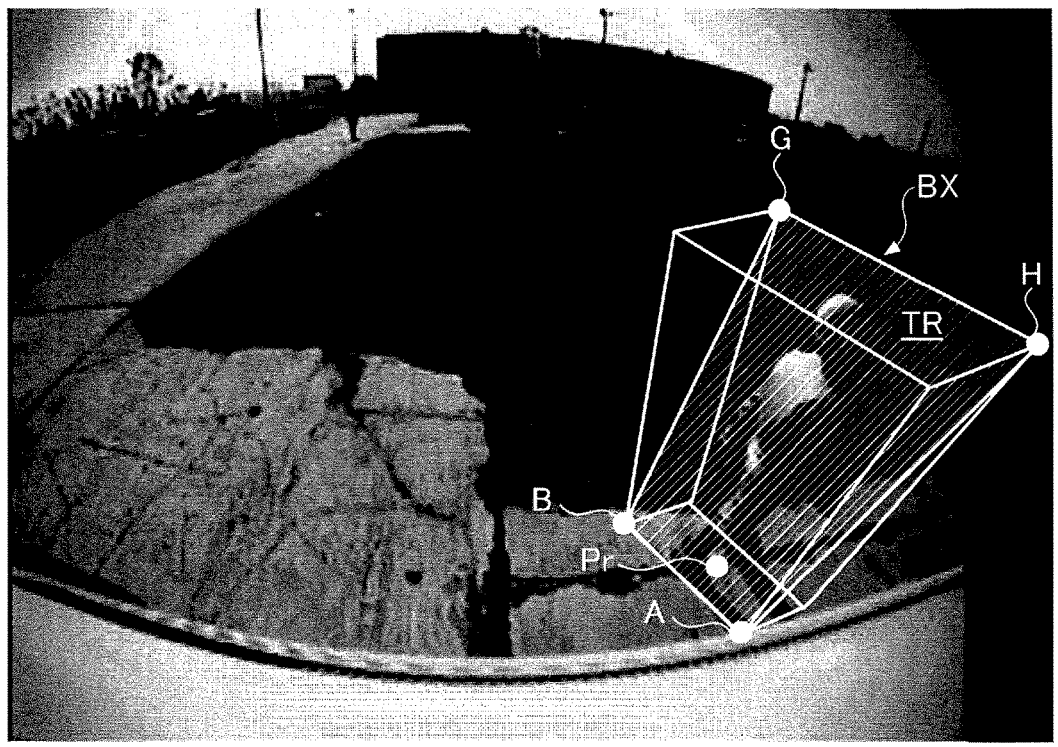
FIG. 6A illustrates a captured image of the back-side camera.
Figure 6B:
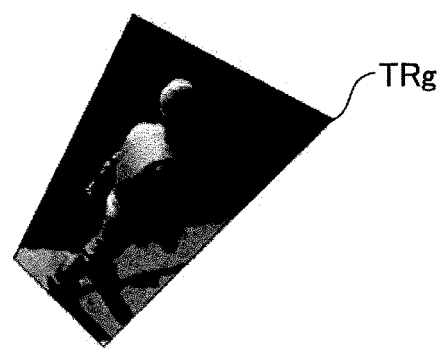
FIG. 6B is a clipped view of the region of a target image in the captured image.
Figure 6C:
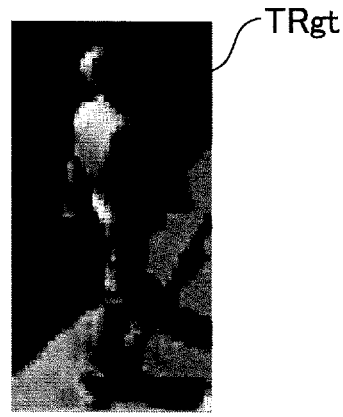
FIG. 6C illustrates a normalized image to which the target image is normalized.

FIGS. 6A through 6C are diagrams illustrating the flow of a process of generating a normalized image from a captured image. Specifically, FIG. 6A is a captured image of the back-side camera 40B, on which the box BX placed in relation to the reference point Pr in a real space is shown. FIG. 6B is a clipped view of the region of a target image (hereinafter, "target image region TRg") in the captured image, corresponding to the virtual plane region TR shown on the captured image of FIG. 6A. FIG. 6C illustrates a normalized image TRgt to which the target image having the target image region TRg is normalized.

As illustrated in FIG. 6A, the box BX placed in relation to the reference point Pr1 in the real space determines the position of the virtual plane region TR in the real space, and determines the target image region TRg on the captured image corresponding to the virtual plane region TR.

Thus, once the position of the reference point Pr in a real space is determined, the position of the virtual plane region TR in the real space is uniquely determined, and the target image region TRg in a captured image as well is uniquely determined. Then, the extracting part 31 can generate the normalized image TRgt of a predetermined size by normalizing a target image having the target image region TRg. According to this embodiment, the size of the normalized image TRgt is, for example, vertically 64 pixels and horizontally 32 pixels.

Figure 7A:
FIG. 7A illustrates a target image region in a captured image.
Figure 7B:
FIG. 7B illustrates a normalized image of a target image.
Figure 7C:
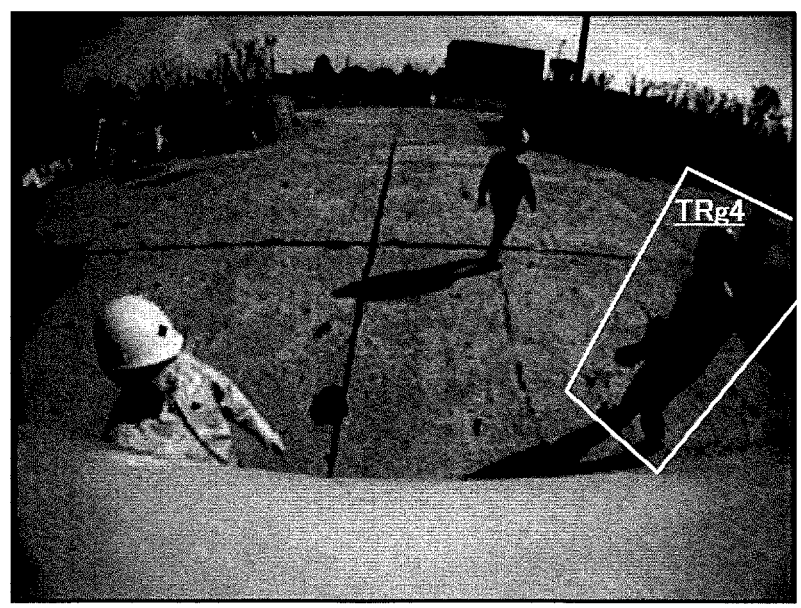
FIG. 7C illustrates another target image region in the captured image.
Figure 7D:
FIG. 7D illustrates a normalized image of another target image.
Figure 7E:
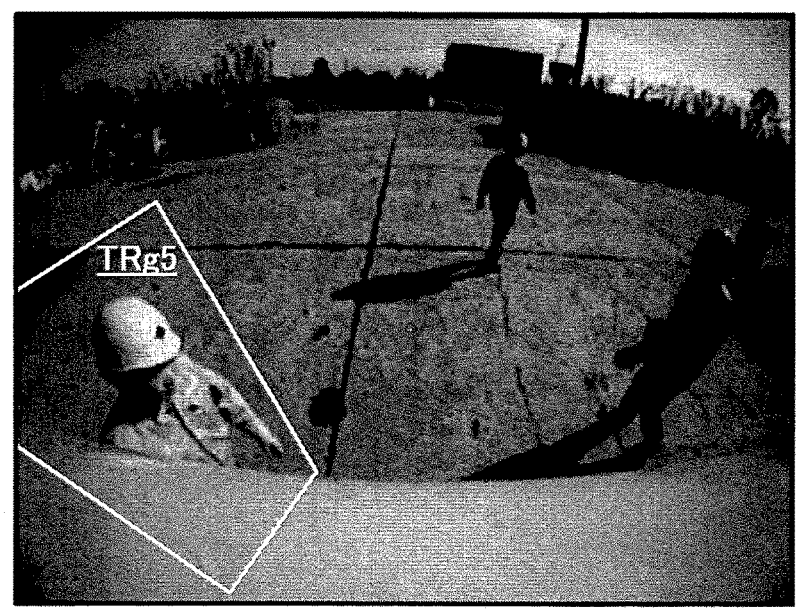
FIG. 7E illustrates yet another target image region in the captured image.
Figure 7F:
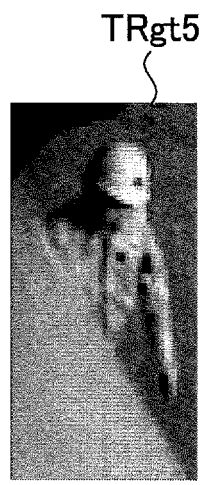
FIG. 7F illustrates a normalized image of yet another target image.

FIGS. 7A through 7F are diagrams illustrating the relationship of a captured image, a target image region, and a normalized image. Specifically, FIG. 7A illustrates a target image region TRg3 in a captured image, and FIG. 7B illustrates a normalized image TRgt3 of a target image having the target image region TRg3. Furthermore, FIG. 7C illustrates a target image region TRg4 in the captured image, and FIG. 7D illustrates a normalized image TRgt4 of a target image having the target image region TRg4. Likewise, FIG. 7E illustrates a target image region TRg5 in the captured image, and FIG. 7F illustrates a normalized image TRgt5 of a target image having the target image region TRg5.

As illustrated in FIGS. 7A through 7F, the target image region TRg5 in the captured image is larger than the target image region TRg4 in the captured image. This is because the distance between a virtual plane region corresponding to the target image region TRg5 and the back-side camera 40B is smaller than the distance between a virtual plane region corresponding to the target image region TRg4 and the back-side camera 40B. Likewise, the target image region TRg4 in the captured image is larger than the target image region TRg3 in the captured image. This is because the distance between the virtual plane region corresponding to the target image region TRg4 and the back-side camera 40B is smaller than the distance between a virtual plane region corresponding to the target image region TRg3 and the back-side camera 40B. That is, a target image region in a captured image is smaller as the distance between a corresponding virtual plane region and the back-side camera 40B is greater. Meanwhile, the normalized images TRgt3, TRgt4, and TRgt5 are all rectangular images of the same size.

Thus, the extracting part 31 can normalize a prospective person image including a person image by normalizing a target image that can take various shapes and sizes in a captured image to a rectangular image of a predetermined size. Specifically, the extracting part 31 places a partial image presumed to be the head of a prospective person image (hereinafter, "head partial image") in a predetermined region of a normalized image. Furthermore, the extracting part 31 places a partial image presumed to be the trunk of the prospective person image (hereinafter, "trunk partial image") in another predetermined region of the normalized image, and places a partial image presumed to be the legs of the prospective person image (hereinafter, "leg partial image") in yet another predetermined region of the normalized image. Furthermore, the extracting part 31 can obtain the normalized image with a reduced inclination of the prospective person image (image inclination) relative to the shape of the normalized image.

Next, a normalization process in the case where a target image region includes an image region adversely affecting identification of a person image to be unsuitable for identification (hereinafter, "identification process unsuitable region") is described with reference to FIGS. 8A and 8B. The identification process unsuitable region is a known region where a person image cannot be present, and includes, for example, a region into which the body of the shovel is captured (hereinafter "body captured region"), a region protruding from a captured image (hereinafter, "protruding region"), etc. FIGS. 8A and 8B are diagrams illustrating the relationship between a target image region and an identification process unsuitable region, and correspond to FIGS. 7E and 7F, respectively. Furthermore, in FIG. 8A, a hatched region of oblique lines sloping to the right corresponds to a protruding region R1, and a hatched region of oblique lines sloping to the left corresponds to a body captured region R2.

According to this embodiment, when the target image region TRg5 includes the protruding region R1 and part of the body captured region R2, the extracting part 31 masks these identification process unsuitable regions and thereafter generates the normalized image TRgt5 of a target image having the target image region TRg5. Alternatively, the extracting part 31 may generate the normalized image TRgt5 and thereafter mask part of the normalized image TRgt5 corresponding to the identification process unsuitable regions.

FIG. 8B shows the normalized image TRgt5. In FIG. 8B, a hatched region of oblique lines sloping to the right represents a masked region M1 corresponding to the protruding region R1, and a hatched region of oblique lines sloping to the left represents a masked region M2 corresponding to the part of the body captured region R2.

Thus, by masking the image of an identification process unsuitable region, the extracting part 31 prevents the image of the identification process unsuitable region from affecting an identification process by the identifying part 32. This masking makes it possible for the identifying part 32 to identify whether it is a person image, using the image of a region other than a masked region in a normalized image without being affected by the image of an identification process unsuitable region. The extracting part 31 may alternatively use a known method other than masking to prevent the image of an identification process unsuitable region from affecting an identification process by the identifying part 32.

Figure 9:
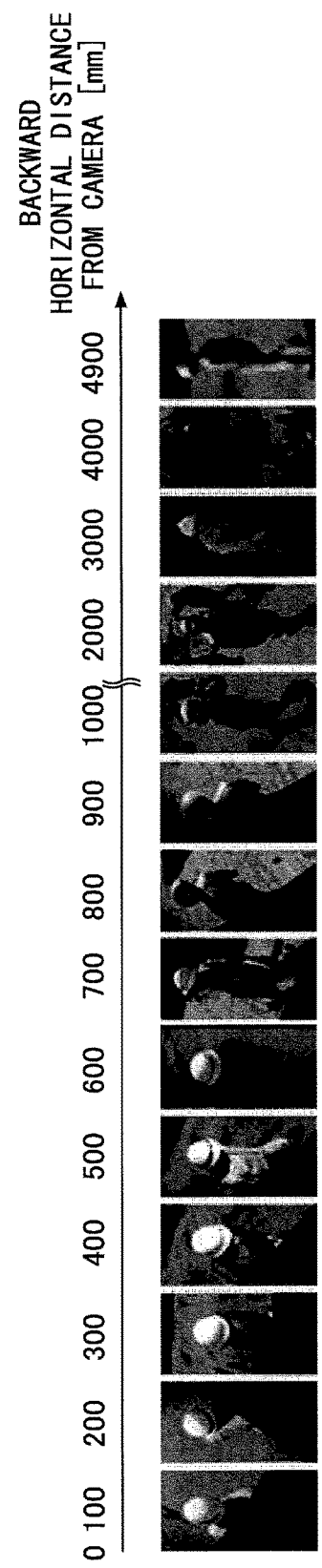
FIG. 9 is a diagram illustrating normalized images.

Next, features of a normalized image generated by the extracting part 31 are described with reference to FIG. 9. FIG. 9 is a diagram illustrating normalized images. Furthermore, in the fourteen normalized images illustrated in FIG. 9, a normalized image closer to the left end of the drawing includes the image of a prospective person at a position closer to the back-side camera 40B, and a normalized image closer to the right end of the drawing includes the image of a prospective person at a position more distant from the back-side camera 40B.

As illustrated in FIG. 9, the extracting part 31 can place a head partial image, a trunk partial image, a leg partial image, etc., in substantially the same proportion in any normalized image regardless of the backward horizontal distance (the horizontal distance along the Y-axis illustrated in FIG. 5) between the virtual plane region TR and the back-side camera 40B in a real space. Therefore, the extracting part 31 can reduce a computational load at the time when the identifying part 32 executes an identification process and improve the reliability of the result of the identification. The above-described backward horizontal distance is an example of the information related to the positional relationship between the virtual plane region TR and the back-side camera 40B in a real space, and the extracting part 31 adds the information to an extracted target image. Furthermore, the above-described information related to the positional relationship includes the angle of a line segment connecting the reference point Pr corresponding to the virtual plane region TR and the back-side camera 40B to the optical axis of the back-side camera 40B in a top plan view, etc.

By the above-described configuration, the surroundings monitoring system 100 generates the normalized image TRgt from the target image region TRg corresponding to the virtual plane region TR facing toward the image capturing apparatus 40 and inclined relative to a virtual ground surface that is a horizontal plane. Therefore, it is possible to realize normalization that takes into account how a person appears in the height direction and the depth direction. As a result, even in the case of using a captured image of the image capturing apparatus 40 attached to a construction machine to capture an image of a person obliquely from above, it is possible to detect a person present around the construction machine with more certainty. In particular, even when a person is close to the image capturing apparatus 40, a normalized image can be generated from a target image occupying a region of sufficient size on a captured image, and therefore, it is possible to ensure detection of the person.

Furthermore, the surroundings monitoring system 100 defines the virtual plane region TR as a rectangular region formed by four vertices A, B, G and H of the box BX, which is a virtual rectangular parallelepiped in a real space. Therefore, it is possible to geometrically correlate the reference point Pr and the virtual plane region TR in the real space, and it is further possible to geometrically correlate the virtual plane region TR in the real space and the target image region TRg in a captured image.

Furthermore, the extracting part 31 masks the image of an identification process unsuitable region included in the target image region TRg. Therefore, the identifying part 32 can identify whether it is a person image, using the image of a region other than masked regions in a normalized image without being affected by the images of identification process unsuitable regions including the body captured region R2.

Furthermore, the extracting part 31 can extract a target image reference point Pr by reference point Pr. Furthermore, each target image region TRg is correlated with one of the reference points Pr that are preset as the assumed standing positions of a person through the corresponding virtual plane region TR. Therefore, the surroundings monitoring system 100 can extract a target image that is highly likely to include a prospective person image by extracting a reference point Pr at which a person is highly likely to be present by any method. In this case, it is possible to prevent an identification process by image processing of a relatively large amount of computation from being performed on a target image that is less likely to include a prospective person image, thus making it possible to increase the speed of a person detecting process.

Figure 10:
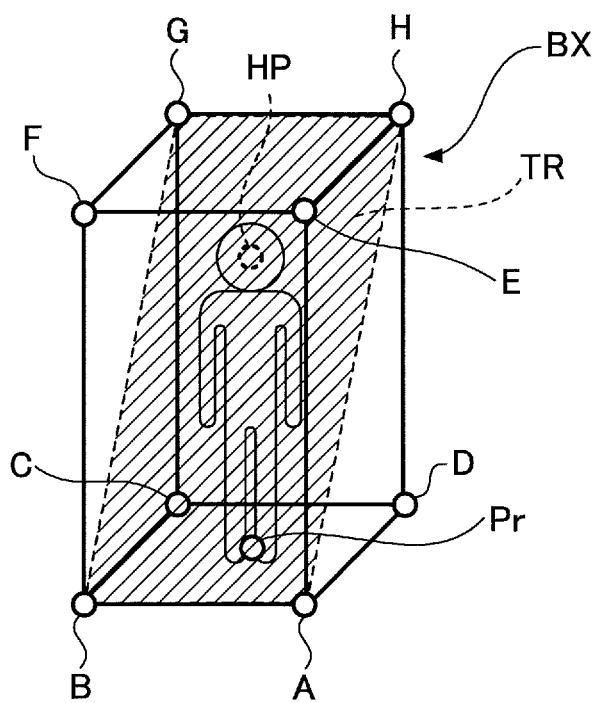
FIG. 10 is a schematic diagram illustrating another geometric relationship used in clipping a target image from a captured image.
Figure 11A:
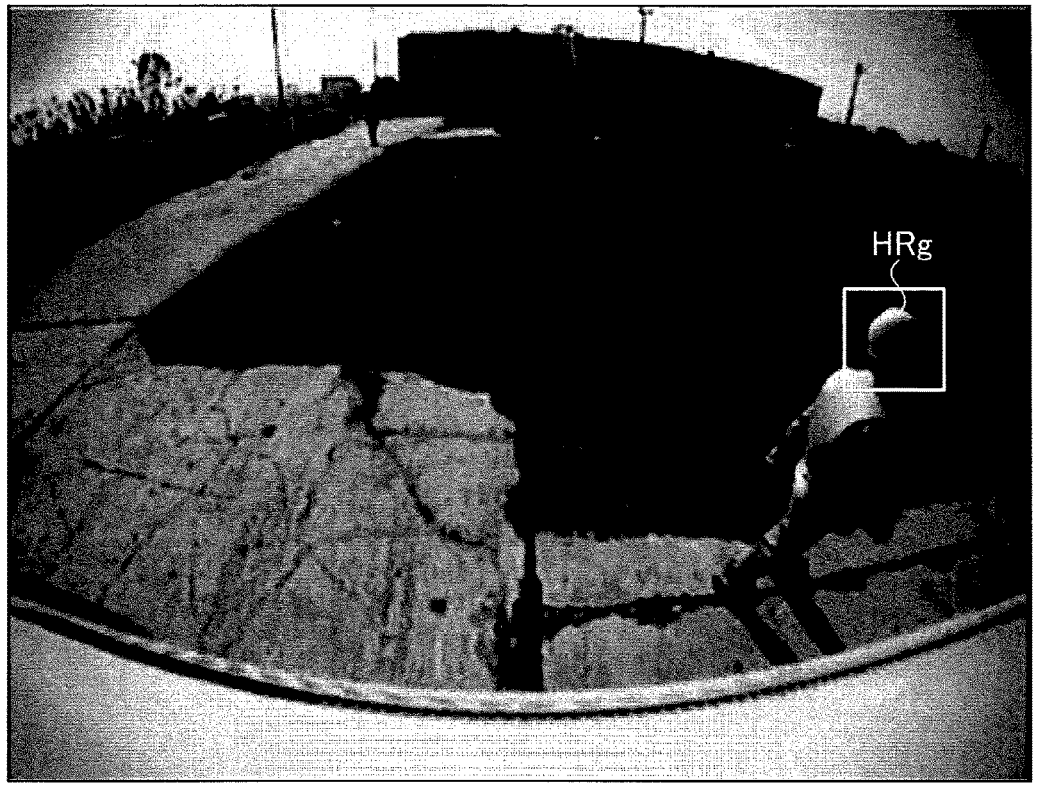
FIGS. 11A and 11B are diagrams illustrating a feature image in a captured image.
Figure 11B:
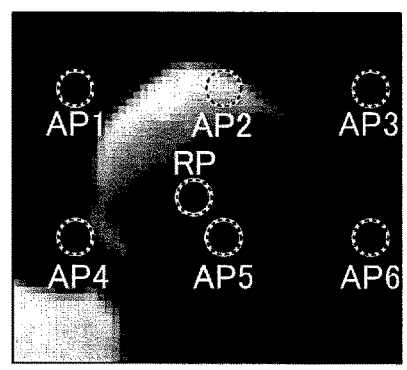

Next, a process of extracting a target image that is highly likely to include a prospective person image by the extracting part 31 is described with reference to FIGS. 10, 11A and 11B. FIG. 10 is a schematic diagram illustrating a geometric relationship that the extracting part 31 uses to clip a target image from a captured image, and corresponds to FIG. 4. FIGS. 11A and 11B are diagrams illustrating a feature image in a captured image. The feature image is an image that represents a characteristic part of a person, and is desirably an image that represents a part that is less likely to change in height from a ground surface in a real space. Therefore, the feature image includes, for example, the image of a helmet, the image of a shoulder, the image of a head, the image of a reflector or marker attached to a person, etc.

In particular, the helmet is characterized in that its shape is substantially spherical so that its projected image projected onto a captured image is constantly close to a circle irrespective of the image capturing direction. In addition, the helmet is characterized in that the surface is rigid and glossy or semi-glossy so that its projected image is likely to create a local high-luminance region and a radial luminance gradient around the region when projected onto a captured image. Therefore, the image of a helmet is particularly preferable as the feature image. The characteristic that its projected image is close to a circle, the characteristic that its projected image is likely to create a radial luminance gradient around a local high-luminance region, etc., may be used for image processing to find out the image of a helmet from a captured image. Furthermore, the image processing to find out the image of a helmet from a captured image includes, for example, a luminance smoothing process, a Gaussian smoothing process, a maximum luminance point search process, a minimum luminance point search process, etc.

According to this embodiment, the extracting part 31 finds out a helmet image (technically, an image that can be presumed to be a helmet) in a captured image by the preceding image recognition process. This is because a person who works around the shovel is believed to wear a helmet. Then, the extracting part 31 derives the most relevant reference point Pr from the position of the found-out helmet image. Then, the extracting part 31 extracts a target image corresponding to the reference point Pr.

Specifically, the extracting part 31, using the geometric relationship illustrated in FIG. 10, derives the highly relevant reference point Pr from the position of the helmet image in the captured image. The geometric relationship of FIG. 10 is different in determining a virtual head position HP in a real space from, but otherwise is equal to, the geometric relationship of FIG. 4.

The virtual head position HP, which represents the head position of a person presumed to be present at the reference point Pr, is placed immediately above the reference point Pr, and according to this embodiment, is placed at a height of 1700 mm above the reference point Pr. Therefore, once the virtual head position HP is determined in a real space, the position of the reference point Pr in the real space is uniquely determined, and the position of the virtual plane region TR in the real space as well is uniquely determined. Furthermore, the target image region TRg in a captured image as well is uniquely determined. Then, the extracting part 31 can generate the normalized image TRgt of a predetermined size by normalizing a target image having the target image region TRg.

Conversely, once the position of the reference point Pr in a real space is determined, the virtual head position HP in the real space is uniquely determined, and a head image position AP on a captured image corresponding to the virtual head position HP in the real space as well is uniquely determined. Therefore, the head image position AP can be preset in correlation with each of the preset reference points Pr. The head image position AP may be derived in real time from the reference point Pr.

Therefore, the extracting part 31 searches for a helmet image in a captured image of the back-side camera 40B by the preceding image recognition process. FIG. 11A shows a state where the extracting part 31 has found out a helmet image HRg. Then, in response to finding out the helmet image HRg, the extracting part 31 determines its representative position RP. The representative position RP is a position derived from the size, shape, etc., of the helmet image HRg. According to this embodiment, the representative position RP is the position of the central pixel of a helmet image region including the helmet image HRg. FIG. 11B is an enlarged view of the helmet image region that is a rectangular image region delimited by a white line in FIG. 11A, and shows that the position of the central position of the helmet image region is the representative position RP.

Thereafter, using, for example, a nearest neighbor search algorithm, the extracting part 31 derives the head image position AP nearest to the representative position RP. FIG. 11B shows that six head image positions AP1 through AP6 are preset near the representative position RP, of which the head image position AP5 is the head image position AP nearest to the representative position RP.

Then, the extracting part 31 extracts, from the nearest head image position AP, the corresponding target image region TRg, following the virtual head position HP, the reference point Pr, and the virtual plane region TR, using the geometric relationship illustrated in FIG. 10. Thereafter, the extracting part 31 generates the normalized image TRgt by normalizing a target image having the extracted target image region TRg.

Thus, the extracting part 31 extracts a target image by correlating the representative position RP of the helmet image HRg, which is the position of a feature image of a person in a captured image, with one of the preset head image positions AP (the head image position AP5).

Alternatively, instead of using the geometric relationship illustrated in FIG. 10, the extracting part 31 may use a reference table that directly correlates the head image position AP with the reference point Pr, the virtual plane region TR, or the target image region TRg to extract a target image corresponding to the head image position AP.

Furthermore, the extracting part 31 may alternatively use a known algorithm other than the nearest neighbor search algorithm, such as a hill-climbing algorithm or the mean-shift algorithm, to derive the reference point Pr from the representative position RP. For example, in the case of using a hill-climbing algorithm, the extracting part 31 derives multiple head image positions AP near the representative position RP, and associates the representative position RP with the reference points Pr corresponding to the head image positions AP. At this point, the extracting part 31 weights the reference points Pr so that the weight increases as the distance between the representative position RP and the head image position AP decreases. Then, the extracting part 31 climbs up the distribution of the weights of the reference points Pr to extract the target image region TRg from the reference point Pr having the weight closest to the maximum point of the weights.

Next, a process of extracting a target image by the extracting part 31 of the controller 30 (hereinafter, "image extracting process") is described with reference to FIG. 12. FIG. 12 is a flowchart illustrating the flow of an image extracting process.

First, the extracting part 31 searches a captured image for a helmet image (step ST1). According to this embodiment, the extracting part 31 finds out a helmet image by performing a raster scan on a captured image of the back-side camera 40B by the preceding image recognition process.

In response to finding out the helmet image HRg in the captured image (YES at step ST1), the extracting part 31 obtains the representative position RP of the helmet image HRg (step ST2).

Thereafter, the extracting part 31 obtains the head image position AP nearest to the obtained representative position RP (step ST3).

Thereafter, the extracting part 31 extracts a target image corresponding to the obtained head image position AP (step ST4). According to this embodiment, the extracting part 31 extracts a target image, following the correlation of the head image position AP in the captured image, the virtual head position HP in a real space, the reference point Pr as the assumed standing position of a person in the real space, and the virtual plane region TR in the real space, using the geometric relationship illustrated in FIG. 10.

In response to not finding out the helmet image HRg in the captured image (NO at step ST1), the extracting part 31 proceeds to step ST5 without extracting a target image.

Thereafter, the extracting part 31 determines whether the entirety of the captured image has been searched for a helmet image (step ST5).

In response to determining that the entirety of the captured image has not been searched for a helmet image (NO at step ST5), the extracting part 31 executes the process of steps ST1 through ST4 on another region of the captured image.

In response to determining that the entirety of the captured image has been searched for a helmet image (YES at step ST5), the extracting part 31 terminates the current image extracting process.

Thus, the extracting part 31 first finds out the helmet image HRg, and specifies the target image region TRg from the representative position RP of the found-out helmet image HRg by way of the head image position AP, the virtual head position HP, the reference point (assumed standing position) Pr, and the virtual plane region TR. Then, the extracting part 31 can generate the normalized image TRgt of a predetermined size by extracting and normalizing a target image having the specified target image region TRg.

By the above-described configuration, the extracting part 31 of the surroundings monitoring system 100 finds out a helmet image as a feature image in a captured image, and extracts a target image by correlating the representative position RP of the helmet image with one of the head image positions AP serving as a predetermined image position. Therefore, it is possible to narrow down partial images to be subjected to the succeeding image recognition process with a simple system configuration.

Alternatively, the extracting part 31 may first find out the helmet image HRg from a captured image, derive one of the head image positions AP corresponding to the representative position RP of the helmet image HRg, and extract a target image corresponding to the one of the head image positions AP. As yet another alternative, the extracting part 31 may first obtain one of the head image positions AP, and extract a target image corresponding to the one of the head image positions AP if a helmet image is present in a helmet image region that is a predetermined region including the position of a feature image corresponding to the one of the head image positions AP.

Furthermore, the extracting part 31 may alternatively use such a predetermined geometric relationship as illustrated in FIG. 10 to extract a target image from the representative position RP of a helmet image in a captured image. In this case, the predetermined geometric relationship represents the geometric relationship of the target image region TRg in the captured image, the virtual plane region TR in a real space corresponding to the target image region TRg, the reference point Pr (the assumed standing position of a person) in the real space corresponding to the virtual plane region TR, the virtual head position HP corresponding to the reference point Pr (a virtual feature position that is the real-space position of a characteristic part of the person corresponding to the assumed standing position of the person), and the head image position AP in the captured image corresponding to the virtual head position HP (a predetermined image position in the captured image corresponding to the virtual feature position).

Next, referring again to FIG. 2, a description continues to be given of other functional elements of the controller 30.

The tracking part 33 is a functional element to output a final person detection result by tracking identification results that the identifying part 32 outputs at predetermined time intervals. According to this embodiment, the tracking part 33 determines, when a predetermined number of successive identification results with respect to the same person satisfy a predetermined condition, that a corresponding prospective person image is a person image. That is, the tracking part 33 determines that a person is present at a corresponding three-dimensional position (an actual location). Whether it is the same person is determined based on the actual location. Specifically, the tracking part 33, based on the actual location (reference point PrI) of a person in an image identified as a person image in the first identification process by the identifying part 32, derives the reachable area of the person within a predetermined time. The reachable area is determined based on the maximum swing speed of the shovel, the maximum travel speed of the shovel, the maximum travel speed of a person, etc. Then, if the actual location (reference point PrII) of a person in an image identified as a person image in the second identification process by the identifying part 32 is within the area, the tracking part 33 determines that it is the same person. The same applies to the third and subsequent identification processes. When it is identified as a person image of the same person in, for example, four out of six successive identification results, the tracking part 33 determines that a person is present at a corresponding three-dimensional position. Furthermore, even when it is identified as a person image in the first identification process, the tracking part 33 determines that a person is absent at a corresponding three-dimensional position if a person image of the same person is not identified in the subsequent three successive identification processes.

Thus, the extracting part 31, the identifying part 32, and the tracking part 33 in combination form a person detecting part 34 to detect the presence or absence of a person around the shovel based on a captured image of the image capturing apparatus 40.

This configuration makes it possible for the person detecting part 34 to reduce the occurrence of an erroneous report (determining that a person is present although no person is present), a missed report (determining that a person is absent although a person is present), etc.

Furthermore, the person detecting part 34 can determine whether a person is moving toward or away from the shovel based on changes in the actual location of a person in an image identified as a person image. The person detecting part 34 may output a control command to the control part 35 to cause the control part 35 to issue an alarm when the distance from the shovel to the actual location of a person falls below a predetermined value. In this case, the person detecting part 34 may adjust the predetermined value in accordance with the operation information (for example, the swing speed, swing direction, travel speed, travel direction, etc.,) of the shovel.

Furthermore, the person detecting part 34 may determine and recognize a person detected state having at least two stages and a person undetected state. For example, the person detecting part 34 may determine a state where at least one of a distance-related condition and a reliability-related condition is satisfied as a first person detected state (an on-alert state) and determine a state where both are satisfied as a second person detected state (an alarming state). The distance-related condition includes, for example, that the distance from the shovel to the actual location of a person in an image identified as a person image is less than a predetermined value. The reliability-related condition includes, for example, that it is identified as a person image of the same person in four out of six successive identification results. In the first person detected state (on-alert state), a first alarm is output as a preliminary alarm lower in accuracy but faster in response. The first alarm, which is, for example, a low-volume beep sound, is automatically stopped when neither of the two conditions is satisfied. In the second person detected state (alarming state), a second alarm is output as a formal alarm higher in accuracy but slower in response. The second alarm, which is, for example, a large-volume melody sound, is not automatically stopped even when at least one of the conditions is not satisfied, and requires an operator's operation to be stopped.

Figure 13:
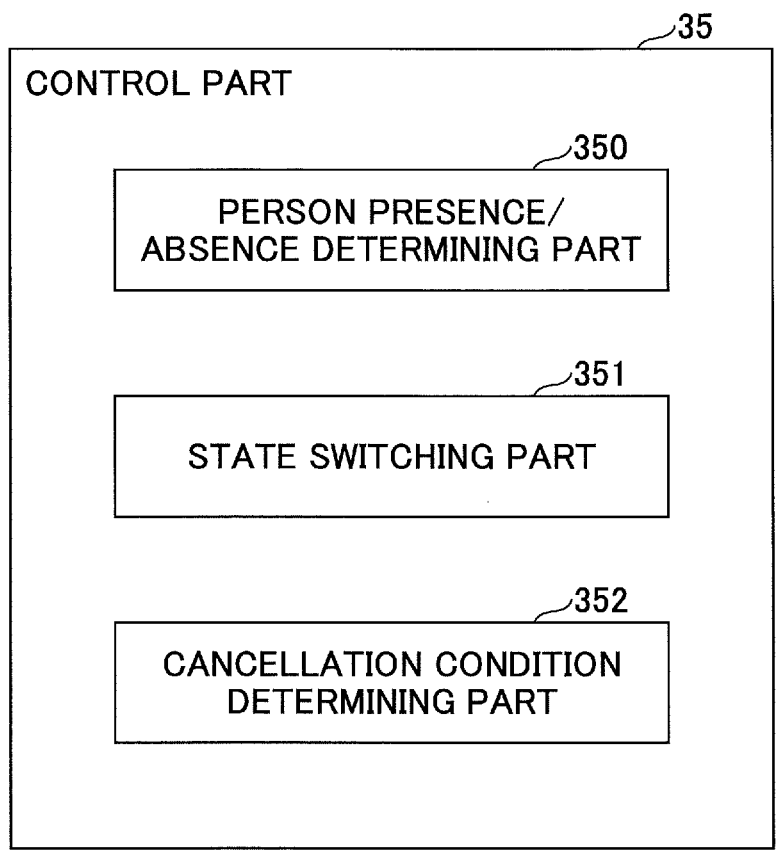
FIG. 13 is a functional block diagram illustrating functions of a control part.

Next, the control part 35 is described in detail with reference to FIG. 13. FIG. 13 is a functional block diagram illustrating functions of the control part 35. In the illustration of FIG. 13, the control part 35 includes a person presence/absence determining part 350, a state switching part 351, and a cancellation condition determining part 352.

The person presence/absence determining part 350 is a functional element to determine the presence or absence of a person around the shovel. The state switching part 351 is a functional element to switch the state of the shovel. The cancellation condition determining part 352 is a functional element to determine whether a cancellation condition is satisfied.

The person presence/absence determining part 350 determines whether a person is present around the shovel in accordance with, for example, the final person detection result of the tracking part 33 constituting the person detecting part 34. The person presence/absence determining part 350, however, may alternatively determine whether a person is present around the shovel, using a more generalized person detection result (for example, using only the identification result of the identifying part 32) without using the final person detection result by the tracking part 33. The state switching part 351 outputs a control command to the machine control unit 51 to switch the state of the shovel between a first state and a second state. The first state includes a state where a restriction on the operation of the shovel is canceled, a state where the output of an alarm is stopped, etc. The second state includes a state where the operation of the shovel is restricted or stopped, a state where an alarm is being output, etc. According to this embodiment, when the person presence/absence determining part 350 determines that a person is present within a predetermined area around the shovel based on the final person detection result of the tracking part 33, the state switching part 351 outputs a control command to the machine control unit 51 to switch the state of the shovel from the first state to the second state. For example, the operation of the shovel is stopped. In this case, an operation by the operator is invalidated. The invalidation of an operation by the operator is realized by, for example, making the operation apparatus unresponsive. Specifically, the operation of the shovel is stopped by forcibly creating a non-operating state by outputting a control command to the gate lock valve to separate the operation apparatus from a hydraulic system. Alternatively, a control command may be output to the engine control unit to stop the engine. As yet another alternative, the operation of a hydraulic actuator may be restricted by outputting a control command to a control valve controlling the flow rate of hydraulic oil flowing into the hydraulic actuator to change the opening area, opening area changing speed, etc., of the control valve. In this case, the maximum swing speed, the maximum travel speed, etc., are reduced. Alternatively, the control valve may be closed to stop the operation of the hydraulic actuator.

Furthermore, the state switching part 351 returns the state of the shovel to the first state when the cancellation condition determining part 352 determines that a predetermined cancellation condition is satisfied after setting the state of the shovel to the second state. That is, when the cancellation condition determining part 352 determines that a predetermined condition is satisfied after the operation of the shovel is restricted or stopped, the restriction or stopping is canceled. The predetermined cancellation condition includes, for example, "determining that a person is absent within a predetermined area around the shovel" (hereinafter, "first cancellation condition"). Furthermore, the predetermined cancellation condition additionally includes, for example, that "it is ensured that the shovel is prevented from starting to operate" (hereinafter, "second cancellation condition"). Furthermore, the predetermined cancellation condition may include that "it is confirmed by the operator that a person is absent around the shovel" (hereinafter, "third cancellation condition"). According to this embodiment, whether or not the operation of the shovel is restricted or stopped and whether each of the first cancellation condition, the second cancellation condition, and the third cancellation condition is satisfied are managed using a flag.

The first cancellation condition includes, for example, that "the person presence/absence determining part 350 determines that a person is absent within a predetermined area around the shovel, based on the final person detection result of the tracking part 33 constituting the person detecting part 34."

The second cancellation condition includes, for example, that "all operation apparatuses are in a neutral position for a predetermined time or more," "the gate lock lever is lowered (the operation apparatuses are disabled)," "the operator's hands and feet are off all operation apparatuses," "a predetermined cancellation operation has been performed," etc. The cancellation condition determining part 352 detects that "all operation apparatuses are in a neutral position for a predetermined time or more" based on, for example, the presence or absence of commands from the operation apparatuses, the output values of sensors that detect the amount of operation of the operation apparatuses, etc. The condition "for a predetermined time or more" is effective in preventing the second cancellation condition from being satisfied by just being in a neutral position for a moment. The cancellation condition determining part 352 detects that "the operator's hands and feet are off operation apparatuses" based on, for example, a captured image of a camera to capture an image of the inside of a cab, the output of a capacitive sensor attached to an operation apparatus (for example, the grip of an operation apparatus), etc. The cancellation condition determining part 352 detects that "a predetermined cancellation operation has been performed" when, for example, with a message such as "IS IT ENSURED THAT SHOVEL IS PREVENTED FROM STARTING TO OPERATE?" being displayed on the screen of an in-vehicle display, a confirmation button (for example, a horn button or a software button displayed on the same screen) is depressed. The cancellation condition determining part 352 may determine that "it is ensured that the shovel is prevented from starting to operate" when, for example, the operator has performed a predetermined cancellation operation such as inputting an operation to a lever, button, panel or the like at a driver's seat.

The third cancellation condition is satisfied when, for example, a confirmation button is depressed with a message such as "IS IT CONFIRMED THAT THERE IS NO PERSON AROUND SHOVEL?" being displayed on the screen of an in-vehicle display. The third cancellation condition may be omitted.

When the third cancellation condition is included in the predetermined cancellation condition, the shovel enters a restriction cancelable state in response to the first cancellation condition and the second cancellation condition being satisfied. The restriction cancelable state means a state where a restriction can be canceled once the operator confirms the absence of a person around the shovel.

There is no restriction on the order the first cancellation condition, the second cancellation condition, and the third cancellation condition are satisfied. For example, even when the cancellation condition determining part 352 determines that the third cancellation condition, the second cancellation condition, and the first cancellation condition have been satisfied in this order, the state switching part 351 cancels a restriction on or the stopping of the operation of the shovel.

Furthermore, the state switching part 351 may cancel the restriction or stopping upon passage of a predetermined wait time since determination by the cancellation condition determining part 352 that a predetermined cancellation condition is satisfied, in order to avoid upsetting the operator with a sudden cancellation.

Furthermore, in the case of having restricted or stopped the operation of the shovel, the state switching part 351 may output a control command to an in-vehicle display serving as the output apparatus 50 to cause a captured image including a person image that has caused it to be displayed. For example, when a person image is included in only a captured image of the left-side camera 40L, a through image of the left-side camera 40L may be displayed alone. Alternatively, when a person image is included in each of a captured image of the left-side camera 40L and a captured image of the back-side camera 40B, the respective through images of the two cameras may be simultaneously displayed side by side or a single composite image (for example, a view transformed image) including the captured images of the two cameras may be displayed. Furthermore, an image showing that it is being restricted or stopped, guidance on the method of cancellation, etc., may also be displayed. Furthermore, a partial image corresponding to a prospective person image identified as a person image may be highlighted and displayed. For example, the outline of the target image region TRg may be displayed in a predetermined color. Furthermore, when a wait time after the satisfaction of a predetermined cancellation condition is set, the operator may be notified that there is a wait time after the satisfaction of a predetermined cancellation condition. For example, with the presence of a wait time being indicated, a countdown of the wait time may be displayed. Furthermore, when an alarm is output during a wait time, the volume of the alarm may be gradually reduced with the passage of the wait time.

Furthermore, in the case of having restricted or stopped the operation of the shovel, the state switching part 351 may output a control command to an in-vehicle loudspeaker serving as the output apparatus 50 to cause an alarm to be output on the side on which a person that has caused it is present. In this case, the in-vehicle loudspeaker is composed of, for example, a right-side loudspeaker installed in a right wall inside the cab, a left-side loudspeaker installed in a left wall inside the cab, and a back-side loudspeaker installed in a back wall inside the cab. When a person image is included in only a captured image of the left-side camera 40L, the state switching part 351 causes an alarm to be output from only the left-side loudspeaker. Alternatively, the state switching part 351 may use a surround sound system including multiple loudspeakers to localize a sound so that a sound is heard from the left side.

Furthermore, when the person presence/absence determining part 350 determines that the person detecting part 34 has identified a prospective person image as a person image, the state switching part 351 may only output an alarm without restricting or stopping the operation of the shovel. In this case as well, the person presence/absence determining part 350 may determine a state where at least one of the distance-related condition and the reliability-related condition is satisfied as the first person detected state (on-alert state) and determine a state where both are satisfied as the second person detected state (alarming state) the same as described above. Then, the same as in the case of having restricted or stopped the operation of the shovel, the state switching part 351 may stop the alarm in the second person detected state (alarming state) when a predetermined cancellation condition is satisfied. This is because unlike the alarm in the first person detected state (on-alert state) that can be automatically stopped, the alarm in the second person detected state (alarming state) requires an operation by the operator to be stopped.

Figure 14:
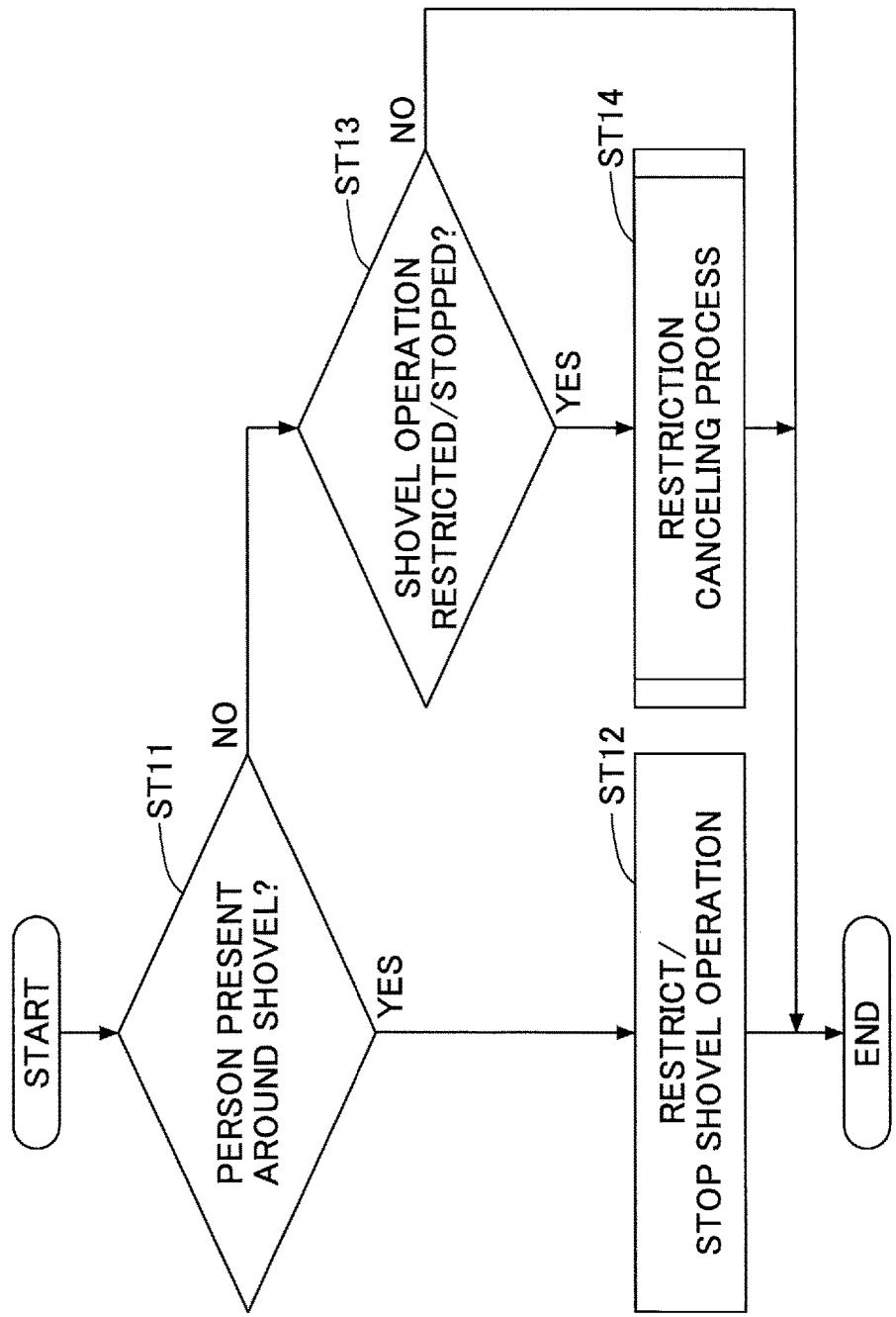
FIG. 14 is a flowchart illustrating the flow of a surroundings monitoring process.

Next, a process of monitoring the surroundings of the shovel by the control part 35 of the controller 30 (hereinafter, "a surroundings monitoring process") is described with reference to FIG. 14. FIG. 14 is a flowchart illustrating the flow of a surroundings monitoring process. The controller 30 repeatedly executes this surroundings monitoring process in a predetermined control cycle.

First, the person presence/absence determining part 350 determines whether a person is present around the shovel (step ST11). According to this embodiment, the person presence/absence determining part 350 determines whether a person is present around the shovel based on the final person detection result of the tracking part 33.

Thereafter, if the person presence/absence determining part 350 determines that a person is present around the shovel (YES at step ST11), the state switching part 351 restricts or stops the operation of the shovel (step ST12). According to this embodiment, for example, the state switching part 351 determines that a person is present around the shovel and stops the operation of the shovel when the person presence/absence determining part 350 determines that the current person detected state is the second person detected state (alarming state).

At this point, the state switching part 351 outputs a control command to an in-vehicle loudspeaker serving as the output apparatus 50 to cause the second alarm to be output. Furthermore, the state switching part 351 outputs a control command to an in-vehicle display serving as the output apparatus 50 to cause a captured image including a person image that has caused the restriction or stopping to be displayed.

If the person presence/absence determining part 350 determines that a person is absent around the shovel (NO at step ST11), the state switching part 351 determines whether the operation of the shovel is already restricted or stopped (step ST13). According to this embodiment, the state switching part 351 refers to the value of a corresponding flag to determine whether the operation of the shovel is already restricted or stopped.

In response to determining that the operation of the shovel is already restricted or stopped (YES at step ST13), the state switching part 351 executes a process for canceling the restriction or stopping (hereinafter, "a restriction canceling process") (step ST14).

In response to determining that the operation of the shovel is not yet restricted or stopped (NO at step ST13), the state switching part 351 terminates the current shovel surroundings monitoring process without executing the restriction canceling process.

Figure 15A:
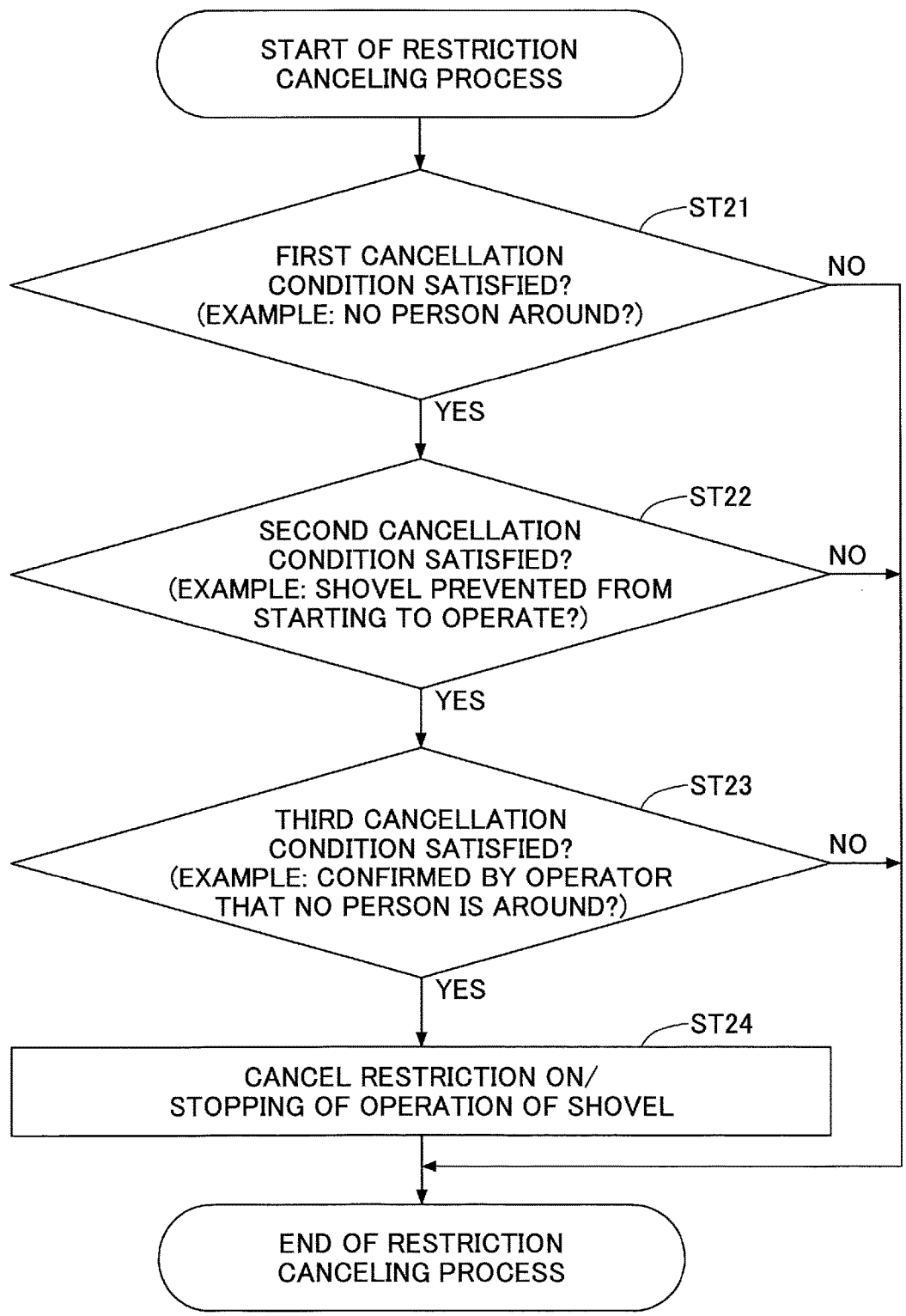
FIG. 15A is a flowchart illustrating the flow of a restriction canceling process.

Next, a process of canceling a restriction on or the stopping of the operation of the shovel by the control part 35 of the controller 30 is described with reference to FIGS. 15A through 15D. FIG. 15A is a flowchart illustrating a flow of the restriction canceling process illustrated at step ST14 of FIG. 14. FIG. 15B is a table illustrating examples of the first cancellation condition. FIG. 15C is a table illustrating examples of the second cancellation condition. FIG. 15D is a table illustrating examples of the third cancellation condition. The indentation in the tables represents the inclusion relation of conditions.

First, the cancellation condition determining part 352 determines whether the first cancellation condition is satisfied (step ST21). According to this embodiment, the cancellation condition determining part 352 determines whether a person is absent within a predetermined area around the shovel. Specifically, it is determined whether the current person detected state is no longer the second person detected state (alarming state). Alternatively, it may be determined whether it is no longer either of the first person detected state (on-alert state) and the second person detected state (alarming state).

In response to determining that the first cancellation condition is satisfied (YES at step ST21), the cancellation condition determining part 352 determines whether the second cancellation condition is satisfied (step ST22). According to this embodiment, the cancellation condition determining part 352 determines whether it is ensured that the shovel is prevented from starting to operate. Specifically, it is determined whether the gate lock lever is lowered (whether the operation apparatus is disabled).

In response to determining that the second cancellation condition is satisfied (YES at step ST22), the cancellation condition determining part 352 determines whether the third cancellation condition is satisfied (step ST23). According to this embodiment, the cancellation condition determining part 352 determines whether it is confirmed by the operator that a person is absent around the shovel. Specifically, it is determined whether a confirmation button is depressed with a message such as "IS IT CONFIRMED THAT THERE IS NO PERSON AROUND SHOVEL?" being displayed on the screen of an in-vehicle display.

In response to determining that the third cancellation condition is satisfied (YES at step ST23), the state switching part 351 cancels a restriction on or the stopping of the operation of the shovel (step ST24).

At this point, the state switching part 351 outputs a control command to an in-vehicle loudspeaker serving as the output apparatus 50 to cause the outputting of the second alarm to be stopped. Furthermore, the state switching part 351 outputs a control command to the in-vehicle display serving as the output apparatus 50 to cause the displaying of a captured image including a person image that has caused the restriction or stopping to be stopped. For example, a through image displayed before the outputting of the second alarm is displayed again. Furthermore, the state switching part 351 may also cause a message indicating the cancellation of a restriction on or the stopping of the operation of the shovel to be displayed.

If the cancellation condition determining part 352 determines that the first cancellation condition is not satisfied (NO at step ST21), that the second cancellation condition is not satisfied (NO at step ST22), or that the third cancellation condition is not satisfied (NO at step ST23), the state switching part 351 terminates the current restriction cancelling process without canceling a restriction on or the stopping of the operation of the shovel.

By the above-described configuration, the controller can restrict or stop the operation of the shovel in response to determining the presence of a person around the shovel.

Furthermore, when determining the absence of a person around the shovel after restricting or stopping the operation of the shovel, the controller 30 can cancel the restriction or stopping only when determining that it is ensured that the shovel is prevented from starting to operate. Alternatively, the controller 30 can cancel the restriction or stopping only when determining that it is ensured that the shovel is prevented from starting to operate and that it is confirmed by the operator that a person is absent around the shovel. Therefore, the controller 30 can prevent the shovel from accidentally starting to operate when the restriction or stopping is canceled.

Thus, in response to determining the presence of a person around the shovel, the controller 30 restricts or stops the operation of the shovel and displays an image of the person. Then, in response to determining the absence of a person around the shovel after restricting or stopping the operation of the shovel, the controller 30 determines that the restriction or stopping can be canceled only when determining that it is ensured that the shovel is prevented from starting to operate. Then, the controller 30 actually cancels the restriction or stopping upon passage of a predetermined wait time. Therefore, it is possible to more appropriately cancel a restriction on the operation of the shovel applied in response to detection of a person.

A preferred embodiment of the present invention is described in detail above. The present invention, however, is not limited to the above-described embodiment, and variations and replacements may be added to the above-described embodiment without departing from the scope of the present invention.

For example, according to the above-described embodiment, it is assumed that a person is detected using a captured image of the image capturing apparatus 40 attached on top of the upper rotating structure 3 of the shovel. The present invention, however, is not limited to this configuration, and is also applicable to a configuration using a captured image of an image capturing apparatus attached to the body of other work machines such as mobile cranes, fixed cranes, lifting magnet machines, and forklifts.

Furthermore, according to the above-described embodiment, an image of a blind spot area of the shovel is captured using three cameras, while one, two, or four or more cameras may alternatively be used to capture an image of a blind spot area of the shovel.

Furthermore, according to the above-described embodiment, a person is detected using a captured image of the image capturing apparatus 40, while a person may alternatively be detected using the output of an ultrasonic sensor, a laser radar, a pyroelectric sensor, a millimeter-wave radar, or the like.

Furthermore, the person detecting process, which is independently applied to each of multiple captured images according to the above-described embodiment, may alternatively be applied to a single composite image generated from multiple captured images.

What is claimed is:

1. A surroundings monitoring system for a work machine, comprising:
   a detecting part configured to detect a monitoring target present within a predetermined area around the work machine; and
   a control part configured to switch a state of the work machine to a first state or a second state based on a detection result of the detecting part,
   wherein the first state includes a state where a restriction on an operation of the work machine is canceled or a state where an alarm is not output,
   the second state includes a state where the operation of the work machine is restricted or a state where the alarm is output,
   the control part is configured to return the state of the work machine to the first state when a predetermined condition is satisfied after switching the state of the work machine to the second state, and
   the predetermined condition includes that the control part determines that no monitoring target is detected within the predetermined area and that the control part determines that the work machine is stopped.

2. The surroundings monitoring system as claimed in claim 1, wherein the control part is configured to cancel the restriction on the operation of the work machine or stop the alarm based on whether the monitoring target is detected around the work machine and whether the work machine is stopped.

3. The surroundings monitoring system as claimed in claim 2, wherein the control part is configured not to cancel the restriction on the operation of the work machine or not to stop the alarm if the work machine is not stopped, even when no monitoring target is detected.

4. The surroundings monitoring system as claimed in claim 1, wherein that the work machine is stopped includes that an operation apparatus is in a neutral position for a predetermined time or more, a gate lock lever is lowered, or hands and feet of an operator are off the operation apparatus.

5. The surroundings monitoring system as claimed in claim 1, wherein that the work machine is stopped includes that a predetermined cancellation operation has been performed.

6. The surroundings monitoring system as claimed in claim 5, wherein the predetermined cancellation operation includes a cancellation operation in a state where a message that encourages confirming that the work machine is prevented from suddenly starting to operate is displayed or a cancellation operation in a state where it is ensured that the work machine is prevented from suddenly starting to operate.

7. The surroundings monitoring system as claimed in claim 1, wherein the state where the operation of the work machine is restricted includes a state where an operation apparatus is disabled, a state where the operation apparatus is unresponsive, a state where an engine is stopped, or a state where an operation of an actuator is restricted.

8. The surroundings monitoring system as claimed in claim 1, wherein the control part is configured to indicate that the state of the work machine is the second state or indicate a method of canceling the second state, when the state of the work machine is the second state.

9. The surroundings monitoring system as claimed in claim 1, wherein the control part is configured to indicate that the second state is canceled when the second state is canceled.

10. The surroundings monitoring system as claimed in claim 1, wherein the control part is configured to indicate that there is a wait time before returning the state of the work machine to the first state or return the state of the work machine to the first state after passage of a predetermined time, when the predetermined condition is satisfied after switching the state of the work machine to the second state.

11. A surroundings monitoring system for a work machine, comprising:
    a detecting part configured to detect a monitoring target present within a predetermined area around the work machine; and
    a control part configured to switch a state of the work machine to a first state or a second state based on a detection result of the detecting part,
    wherein the first state includes a state where an operation of the work machine is valid or a state where an alarm is not output,
    the second state includes a state where the operation of the work machine is invalid or a state where the alarm is output,
    the control part is configured to return the state of the work machine to the first state when a predetermined condition is satisfied after switching the state of the work machine to the second state, and
    the predetermined condition includes that the control part determines that no monitoring target is detected within the predetermined area and that the control part determines that it is ensured that the work machine is prevented from starting to operate.

12. The surroundings monitoring system as claimed in claim 11, wherein the control part is configured to make the operation of the work machine valid or stop the alarm based on whether the monitoring target is detected around the work machine and whether the work machine is prevented from starting to operate.

13. The surroundings monitoring system as claimed in claim 12, wherein the control part is configured not to make the operation of the work machine valid or not to stop the alarm if it is not ensured that the work machine is prevented from starting to operate, even when no monitoring target is detected.

14. The surroundings monitoring system as claimed in claim 11, wherein that the work machine is prevented from starting to operate includes that an operation apparatus is in a neutral position for a predetermined time or more, a gate lock lever is lowered, or hands and feet of an operator are off the operation apparatus.

15. The surroundings monitoring system as claimed in claim 11, wherein that the work machine is prevented from starting to operate includes that a predetermined cancellation operation has been performed.

16. The surroundings monitoring system as claimed in claim 15, wherein the predetermined cancellation operation includes a cancellation operation in a state where a message that encourages confirming that the work machine is prevented from suddenly starting to operate is displayed or a cancellation operation in a state where it is ensured that the work machine is prevented from suddenly starting to operate.

17. The surroundings monitoring system as claimed in claim 11, wherein the state where the operation of the work machine is invalid includes a state where an operation apparatus is disabled, a state where the operation apparatus is unresponsive, a state where an engine is stopped, or a state where an operation of an actuator is restricted.

18. The surroundings monitoring system as claimed in claim 11, wherein the control part is configured to indicate that the state of the work machine is the second state or indicate a method of canceling the second state, when the state of the work machine is the second state.

19. The surroundings monitoring system as claimed in claim 11, wherein the control part is configured to indicate that the second state is canceled when the second state is canceled.

20. The surroundings monitoring system as claimed in claim 11, wherein the control part is configured to indicate that there is a wait time before returning the state of the work machine to the first state or return the state of the work machine to the first state after passage of a predetermined time, when the predetermined condition is satisfied after switching the state of the work machine to the second state.

* * * * *